(12) United States Patent
Kalyanaraman

(10) Patent No.: US 10,465,049 B2
(45) Date of Patent: Nov. 5, 2019

(54) PROCESS FOR THE MANUFACTURE OF THERMOPLASTIC POLYMER PARTICLES WITH IMPROVED PROCESS YIELD

(71) Applicant: SABIC GLOBAL TECHNOLOGIES B.V., Bergen op Zoom (NL)

(72) Inventor: Viswanathan Kalyanaraman, Mount Vernon, IN (US)

(73) Assignee: SABIC GLOBAL TECHNOLOGIES B.V., Bergen op Zoom (NL)

(*) Notice: Subject to any disclaimer, the term of this patent is extended or adjusted under 35 U.S.C. 154(b) by 30 days.

(21) Appl. No.: 15/757,160

(22) PCT Filed: Sep. 2, 2016

(86) PCT No.: PCT/US2016/050046
§ 371 (c)(1),
(2) Date: Mar. 2, 2018

(87) PCT Pub. No.: WO2017/040887
PCT Pub. Date: Mar. 9, 2017

(65) Prior Publication Data
US 2018/0273699 A1    Sep. 27, 2018

Related U.S. Application Data

(60) Provisional application No. 62/214,363, filed on Sep. 4, 2015.

(51) Int. Cl.
*C08J 3/14*    (2006.01)
*C08J 3/12*    (2006.01)

(52) U.S. Cl.
CPC .............. *C08J 3/14* (2013.01); *C08J 3/124* (2013.01); *C08J 2369/00* (2013.01); *C08J 2379/08* (2013.01)

(58) Field of Classification Search
CPC .... C08J 2369/00; C08J 2379/08; C08J 3/124; C08J 3/14; C08J 2389/00
See application file for complete search history.

(56) References Cited

U.S. PATENT DOCUMENTS 3,954,713 A    5/1976 Schnoring et al.
4,668,768 A *  5/1987 Mendiratta ............... C08J 3/14
                                                 523/313

(Continued)

FOREIGN PATENT DOCUMENTS

EP    2810973 A1    12/2014
WO    2012071013 A1    5/2012

OTHER PUBLICATIONS

International Search Report for International Application No. PCT/US2014/025864, International Filing Date Mar. 13, 2014, dated Jul. 7, 2014, 4 pages.

(Continued)

*Primary Examiner* — Satya B Sastri
(74) *Attorney, Agent, or Firm* — Cantor Colburn LLP

(57) ABSTRACT

A process for the manufacture of thermoplastic polymer particles, including combining a first solution including a thermoplastic polymer and an organic solvent with a second solution including an aqueous solvent and a surfactant to provide an emulsion. The emulsion is transferred into a receiving water to remove the organic solvent and form an aqueous dispersion including a plurality of thermoplastic polymer particles dispersed in the aqueous solvent. The thermoplastic polymer particles having a D50 of 20 to 100 µm are recovered in a yield of greater than 85%. Thermoplastic polymer particles prepared according to the method are also disclosed.

15 Claims, 5 Drawing Sheets

(56) References Cited

U.S. PATENT DOCUMENTS

| | | | |
|---|---|---|---|
| 5,196,507 A | | 3/1993 | Totani et al. |
| 5,229,482 A | | 7/1993 | Brunelle |
| 6,001,957 A | | 12/1999 | Puyenbroek et al. |
| 6,489,372 B1 | | 12/2002 | He et al. |
| 6,528,611 B2 | | 3/2003 | Vodermayer et al. |
| 9,181,395 B2 | * | 11/2015 | Kalayaraman .............. C08J 3/14 |
| 2002/0045725 A1 | * | 4/2002 | Vodermayer ............... C08J 3/14 |
| | | | 528/170 |
| 2006/0116468 A1 | * | 6/2006 | Toyoshima ................ C08J 3/14 |
| | | | 524/543 |
| 2010/0305239 A1 | | 12/2010 | Wei et al. |
| 2011/0070442 A1 | * | 3/2011 | Asano .................... C08G 75/23 |
| | | | 428/402 |
| 2011/0300381 A1 | | 12/2011 | Bergerat et al. |
| 2012/0245239 A1 | | 9/2012 | Kalyanaraman et al. |
| 2014/0275365 A1 | * | 9/2014 | Kalayaraman ............. C08J 3/14 |
| | | | 524/115 |
| 2016/0145391 A1 | | 5/2016 | Kalyanaraman et al. |

OTHER PUBLICATIONS

International Search Report for International Application No. PCT/US2016/050046, International Filing Date Sep. 2, 2016, dated Jan. 3, 2017, 6 pages.

Written Opinion for International Application No. PCT/US2014/025864, International Filing Date Mar. 13, 2014, dated Jul. 7, 2014, 6 pages.

Written Opinion for International Application No. PCT/US2016/050046, International Filing Date Sep. 2, 2016, dated Jan. 3, 2017, 6 pages.

* cited by examiner

PROCESS FOR THE MANUFACTURE OF THERMOPLASTIC POLYMER PARTICLES WITH IMPROVED PROCESS YIELD

CROSS-REFERENCE TO RELATED APPLICATIONS

This application is a National Stage application of PCT/US2016/050046, filed Sep. 2, 2016, which claims the benefit of U.S. Provisional Application No. 62/214,363, filed Sep. 4, 2015, both of which are incorporated by reference herein in their entirety.

BACKGROUND

High performance polymers such as polyetherimide and polycarbonate can be made into ultra-fine powders, for example, powders comprising particles having a diameter of less than or equal to 100 micrometers (μm), by emulsifying the polymer in an organic solvent, and further removing the organic solvent from the emulsion through distillation. Information relevant to such methods can be found in U.S. Pat. No. 6,528,611. However, particles made by such an emulsion distillation process can result in a poor yield of the particles. In particular, the yield of the particles can be less than 90%. In addition, achieving particles having an average size of 20 to 100 μm remains a challenge using known techniques.

Therefore, there is a need for an optimized process in order to obtain spherical polymer particles having an average size of 20 to 100 μm in a higher yield for commercial feasibility. Applications including additive manufacturing and powder coating can benefit from such a process.

BRIEF DESCRIPTION

A process for the manufacture of thermoplastic polymer particles comprises combining a first solution comprising a thermoplastic polymer and an organic solvent with a second solution comprising an aqueous solvent and a surfactant to provide an emulsion; transferring the emulsion into a receiving water at a temperature of greater than or equal to 50° C., preferably 50 to 100° C., more preferably 55 to 95° C., even more preferably 55 to 85° C. to remove the organic solvent and form an aqueous dispersion comprising a plurality of thermoplastic polymer particles dispersed in the aqueous solvent; and recovering thermoplastic polymer particles having a D50 of 20 to 100 μm, preferably 20 to 90 μm, more preferably 20 to 80 μm, even more preferably 30 to 70 μm; wherein the particles having a diameter less than 150 micrometers are recovered in a yield greater than 85%, preferably greater than 90%, more preferably greater than 95%, even more preferably greater than 97%.

A process for the manufacture of polycarbonate particles comprises combining a first solution comprising a polycarbonate and an organic solvent with a second solution comprising an aqueous solvent and a surfactant comprising gelatin to provide an emulsion, wherein the emulsion comprises water in a water-to-organic solvent weight ratio of 0.5 to 1, the thermoplastic polymer in an amount of 15 to 25 weight percent (wt %), based on the total weight of polycarbonate and organic solvent, and the surfactant in a surfactant-to-polycarbonate weight ratio of 0.01 to 0.04; transferring the emulsion into a receiving water at a temperature of 50 to 100° C. to remove the organic solvent and form an aqueous dispersion comprising a plurality of polycarbonate particles dispersed in water; and recovering polycarbonate particles having a diameter less than 150 micrometers and having a D50 of 20 to 80 μm, in a yield greater than or equal to 90%.

A process for the manufacture of polyetherimide particles comprises combining a first solution comprising a polyetherimide and an organic solvent with a second solution comprising an aqueous solvent and a surfactant comprising gelatin to provide an emulsion, wherein the emulsion comprises water in a water-to-organic solvent weight ratio of 0.5 to 1, the thermoplastic polymer in an amount of 15 to 25 wt %, based on the total weight of polyetherimide and organic solvent, and the surfactant in a surfactant-to-polyetherimide weight ratio of 0.01 to 0.04; and transferring the emulsion into a receiving water at a temperature of 50 to 100° C. to remove the organic solvent and form an aqueous dispersion comprising a plurality of polyetherimide particles dispersed in water; and recovering polyetherimide particles having a diameter less than 150 micrometers and having a D50 of 20 to 80 μm, in a yield greater than or equal to 90%.

Thermoplastic polymer particles prepared by the above-described methods are also described.

In an embodiment, thermoplastic polymer particles comprises a thermoplastic polymer and gelatin, wherein the thermoplastic polymer particles have a D50 of 20 to 100 μm; and gelatin is present in an amount of less than 1000 ppm, preferably 1 ppb to 1000 ppm, more preferably 1 ppb to 500 ppm, even more preferably 1 ppb to 100 ppm.

The above described and other features are exemplified by the following figures and detailed description.

BRIEF DESCRIPTION OF THE DRAWINGS

The following figures are of exemplary embodiments.

DETAILED DESCRIPTION

Figure 1:
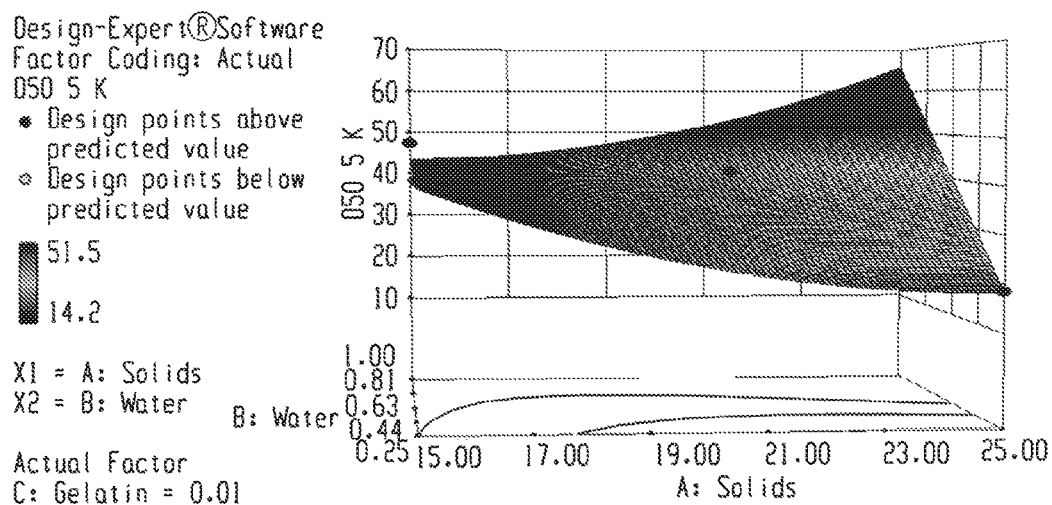
FIG. 1 shows a 3-dimensional (3D) surface area plot of D50 particle size dependence on water ratio and polymer solution concentration.

Disclosed herein is a process for the manufacture of thermoplastic polymer particles which relies on the formation of an aqueous polymer dispersion from an emulsion. Using the process described herein, polymer particles having an average size of 20 to 100 μm can be obtained in high yield (e.g., greater than 90%). The present inventors have discovered varying process parameters including type of surfactant, polymer concentration, water to organic solvent ratio, and ratio of surfactant to polymer can significantly impact the resulting polymer particle size and the overall process yield. Accordingly, the present inventors have identified optimized process conditions which allow for the preparation of polymer particles having a desired size in high yield.

Accordingly, a process for the manufacture of thermoplastic polymer particles is disclosed herein. The process can advantageously provide the polymer particles in a yield of greater than 90%. The process includes combining a first solution comprising a thermoplastic polymer and an organic solvent with a second solution comprising an aqueous solvent and a surfactant to provide an emulsion.

The first solution can generally be prepared by dissolving a thermoplastic polymer in an organic solvent to form the first solution. As used herein, the term "thermoplastic" refers to a material that is plastic or deformable, melts to a liquid when heated, and freezes to a brittle, glassy state when cooled sufficiently. Thermoplastics are typically high molecular weight polymers. Examples of thermoplastic polymers that can be used include polyacetals (e.g., polyoxyethylene and polyoxymethylene), poly($C_{1-6}$ alkyl)acrylates, polyacrylamides, polyamides, (e.g., aliphatic polyamides, polyphthalamides, and polyaramides), polyamideimides, polyanhydrides, polyarylates, polyarylene ethers (e.g., polyphenylene ethers), polyarylene sulfides (e.g., polyphenylene sulfides), polyarylsulfones (e.g., polyphenylene sulfones), polybenzothiazoles, polybenzoxazoles, polycarbonates (including polycarbonate copolymers such as polycarbonate-siloxanes, polycarbonate-esters, and polycarbonate-ester-siloxanes), polyesters (e.g., polyethylene terephthalates, polybutylene terephthalates, polyarylates, and polyester copolymers such as polyester-ethers), polyetheretherketones, polyetherimides (including copolymers such as polyetherimide-siloxane copolymers), polyetherketoneketones, polyetherketones, polyethersulfones, polyimides (including copolymers such as polyimide-siloxane copolymers), poly($C_{1-6}$ alkyl)methacrylates, polymethacrylamides, polynorbornenes (including copolymers containing norbornenyl units), polyolefins (e.g., polyethylenes, polypropylenes, polytetrafluoroethylenes, and their copolymers, for example ethylene-alpha-olefin copolymers), polyoxadiazoles, polyoxymethylene, polyphthalides, polysilazanes, polysiloxanes, polystyrenes (including copolymers such as acrylonitrile-butadiene-styrene (ABS) and methyl methacrylate-butadiene-styrene (MBS)), polysulfides, polysulfonamides, polysulfonates, polysulfones, polythioesters, polytriazines, polyureas, polyurethanes, polyvinyl alcohols, polyvinyl esters, polyvinyl ethers, polyvinyl halides, polyvinyl ketones, polyvinyl thioethers, polyvinylidene fluorides, or the like, or a combination comprising at least one of the foregoing thermoplastic polymers. Polyacetals, polyamides (nylons), polycarbonates, polyesters, polyetherimide, polyolefins, and polystyrene copolymers such as ABS, are especially useful in a wide variety of articles, have good processability, and are recyclable.

Useful polyamides include, but are not limited to, synthetic linear polyamides, e.g., Nylon-6,6; Nylon-6,9; Nylon-6,10; Nylon-6,12; Nylon-11; Nylon-12 and Nylon-4,6, preferably Nylon 6 and Nylon 6,6, or a combination comprising at least one of the foregoing. Polyurethanes that can be used include aliphatic, cycloaliphatic, aromatic, and polycyclic polyurethanes, including those described above. Also useful are poly($C_{1-6}$ alkyl)acrylates and poly($C_{1-6}$ alkyl)methacrylates, which include, for example, polymers of one or more of methyl acrylate, ethyl acrylate, acrylamide, methacrylic acid, methyl methacrylate, n-butyl acrylate, and ethyl acrylate, to name a few.

Representative examples of polyolefins are polyethylene, polypropylene, polybutylene, polymethylpentene (and co-polymers thereof), polynorbornene (and co-polymers thereof), poly 1-butene, poly(3-methylbutene), poly(4-methylpentene) and copolymers of ethylene with propylene, 1-butene, 1-hexene, 1-octene, 1-decene, 4-methyl-1-pentene and 1-octadecene. Representative combinations of polyolefins are combinations containing polyethylene and polypropylene, low-density polyethylene and high-density polyethylene, and polyethylene and olefin copolymers containing copolymerizable monomers, some of which are described above, e.g., ethylene and acrylic acid copolymers; ethyl and methyl acrylate copolymers; ethylene and ethyl acrylate copolymers; ethylene and vinyl acetate copolymers, ethylene, acrylic acid, and ethyl acrylate copolymers, and ethylene, acrylic acid, and vinyl acetate copolymers.

In some embodiments, the thermoplastic polymer comprises a polyetherimide, polycarbonate homopolymer, poly(ester-carbonate), polyarylate, polyimide, polysulfone, polyethersulfone, or a combination comprising at least one of the foregoing. In some embodiments, the thermoplastic polymer comprises polyetherimide, polycarbonate homopolymer, poly(ester-carbonate) poly(siloxane-carbonate), or a combination comprising at least one of the foregoing.

In some embodiments, the thermoplastic polymer comprises a polyetherimide. Polyetherimides comprise more than 1, for example 10 to 1000, or 10 to 500, structural units of formula (1)

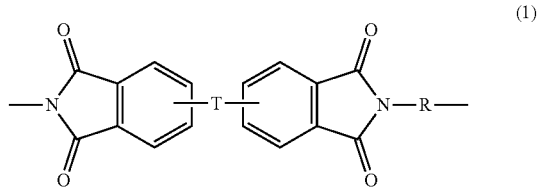

wherein each R is independently the same or different, and is a substituted or unsubstituted divalent organic group, such as a substituted or unsubstituted $C_{6-20}$ aromatic hydrocarbon group, a substituted or unsubstituted straight or branched chain $C_{2-20}$ alkylene group, a substituted or unsubstituted $C_{3-8}$ cycloalkylene group, or a halogenated derivative of any of the foregoing. In some embodiments, R is a divalent group of one or more of the following formulae (2)

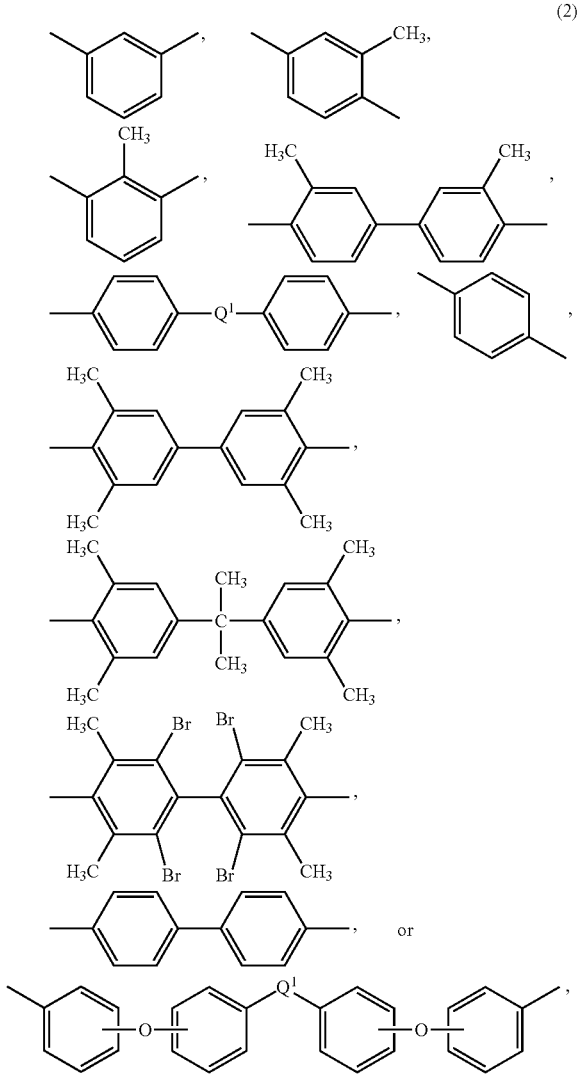

(2)

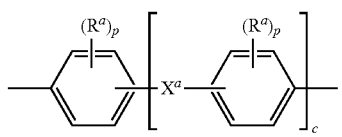

(3)

wherein $R^a$ and $R^b$ are each independently the same or different, and are a halogen atom or a monovalent $C_{1-6}$ alkyl group, for example; p and q are each independently integers of 0 to 4; c is 0 to 4; and $X^a$ is a bridging group connecting the hydroxy-substituted aromatic groups, where the bridging group and the hydroxy substituent of each $C_6$ arylene group are disposed ortho, meta, or para (specifically para) to each other on the $C_6$ arylene group. The bridging group $X^a$ can be a single bond, —O—, —S—, —S(O)—, —S(O)$_2$—, —C(O)—, or a $C_{1-18}$ organic bridging group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. A specific example of a group Z is a divalent group of formula (3a)

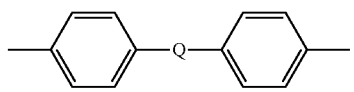

(3a)

wherein Q is —O—, —S—, —C(O)—, —SO$_2$—, —SO—, —P($R^a$)(=O)— wherein $R^a$ is a $C_{1-8}$ alkyl or $C_{6-12}$ aryl, or —C$_y$H$_{2y}$— wherein y is an integer from 1 to 5 or a halogenated derivative thereof (including a perfluoroalkylene group). In a specific embodiment Z is a derived from bisphenol A, such that Q in formula (3a) is 2,2-isopropylidene.

wherein $Q^1$ is —O—, —S—, —C(O)—, —SO$_2$—, —SO—, —P($R^a$)(=O)— wherein $R^a$ is a $C_{1-8}$ alkyl or $C_{6-12}$ aryl, —C$_y$H$_{2y}$— wherein y is an integer from 1 to 5 or a halogenated derivative thereof (which includes perfluoroalkylene groups), or —(C$_6$H$_{10}$)$_z$— wherein z is an integer from 1 to 4. In some embodiments R is m-phenylene, p-phenylene, or a diarylene sulfone, in particular bis(4,4'-phenylene)sulfone, bis(3,4'-phenylene)sulfone, bis(3,3'-phenylene)sulfone, or a combination comprising at least one of the foregoing. In some embodiments, at least 10 mole percent or at least 50 mole percent of the R groups contain sulfone groups, and in other embodiments no R groups contain sulfone groups.

Further in formula (1), T is —O— or a group of the formula —O—Z—O— wherein the divalent bonds of the —O—Z—O— group are in the 3,3', 3,4', 4,3', or the 4,4' positions, and Z is an aromatic $C_{6-24}$ monocyclic or polycyclic moiety optionally substituted with 1 to 6 $C_{1-8}$ alkyl groups, 1 to 8 halogen atoms, or a combination comprising at least one of the foregoing, provided that the valence of Z is not exceeded. Examples of groups Z are groups of formula (3)

In an embodiment in formula (1), R is m-phenylene, p-phenylene, or a combination comprising at least one of the foregoing, and T is —O—Z—O— wherein Z is a divalent group of formula (3a). Alternatively, R is m-phenylene, p-phenylene, or a combination comprising at least one of the foregoing, and T is —O—Z—O— wherein Z is a divalent group of formula (3a) and Q is 2,2-isopropylidene. Alternatively, the polyetherimide can be a copolymer optionally comprising additional structural polyetherimide units of formula (1) wherein at least 50 mole percent (mol %) of the R groups are bis(4,4'-phenylene)sulfone, bis(3,4'-phenylene)sulfone, bis(3,3'-phenylene)sulfone, or a combination comprising at least one of the foregoing and the remaining R groups are p-phenylene, m-phenylene, or a combination comprising at least one of the foregoing; and Z is 2,2-(4-phenylene)isopropylidene, i.e., a bisphenol A moiety.

In some embodiments, the polyetherimide is a copolymer that optionally comprises additional structural imide units that are not polyetherimide units, for example imide units of the formula

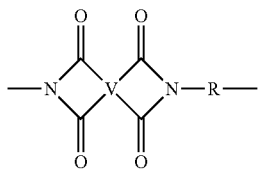

wherein R is as described in formula (1) and each V is the same or different, and is a substituted or unsubstituted $C_{6-20}$ aromatic hydrocarbon group, for example a tetravalent linker of the formulas

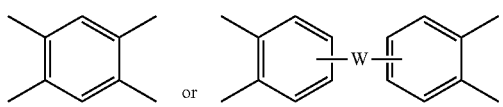

wherein W is a single bond, —O—, —S—, —C(O)—, —SO$_2$—, —SO—, —P(R$^a$)(=O)— wherein R$^a$ is a $C_{1-8}$ alkyl or $C_{6-12}$ aryl, or —C$_y$H$_{2y}$— wherein y is an integer from 1 to 5 or a halogenated derivative thereof (which includes perfluoroalkylene groups). These additional structural imide units preferably comprise less than 20 mol % of the total number of units, and more preferably can be present in amounts of 0 to 10 mol % of the total number of units, or 0 to 5 mol % of the total number of units, or 0 to 2 mole % of the total number of units. In some embodiments, no additional imide units are present in the polyetherimide.

The polyetherimide can be prepared by any of the methods well known to those skilled in the art, including the reaction of an aromatic bis(ether anhydride) of formula (5) or a chemical equivalent thereof, with an organic diamine of formula (6)

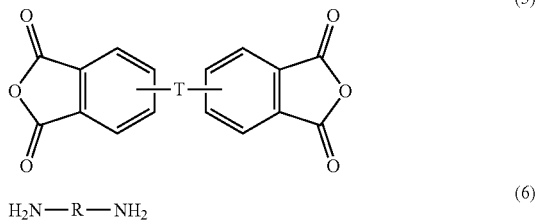

wherein T and R are defined as described above. Copolymers of the polyetherimides can be manufactured using a combination of an aromatic bis(ether anhydride) of formula (5) and an additional bis(anhydride) that is not a bis(ether anhydride), for example pyromellitic dianhydride or bis(3,4-dicarboxyphenyl) sulfone dianhydride.

Illustrative examples of aromatic bis(ether anhydride)s include 2,2-bis[4-(3,4-dicarboxyphenoxy)phenyl]propane dianhydride (also known as bisphenol A dianhydride or BPADA), 3,3-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy) benzophenone dianhydride; 4,4'-bis(2,3-dicarboxyphenoxy) diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy) benzophenone dianhydride; 4,4'-(hexafluoroisopropylidene) diphthalic anhydride; and 4-(2,3-dicarboxyphenoxy)-4'-(3,4-dicarboxyphenoxy)diphenyl sulfone dianhydride. A combination of different aromatic bis(ether anhydride)s can be used.

Examples of organic diamines include 1,4-butane diamine, 1,5-pentanediamine, 1,6-hexanediamine, 1,7-heptanediamine, 1,8-octanediamine, 1,9-nonanediamine, 1,10-decanediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis (3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(p-amino-t-butyl) toluene, bis(p-amino-t-butylphenyl) ether, bis(p-methyl-o-aminophenyl) benzene, bis(p-methyl-o-aminopentyl) benzene, 1,3-diamino-4-isopropylbenzene, bis(4-aminophenyl) sulfide, bis-(4-aminophenyl) sulfone (also known as 4,4'-diaminodiphenyl sulfone (DDS)), and bis(4-aminophenyl) ether. Any regioisomer of the foregoing compounds can be used. $C_{1-4}$ alkylated or poly($C_{1-4}$ alkylated) derivatives of any of the foregoing can be used, for example a polymethylated 1,6-hexanediamine. Combinations of these compounds can also be used. In some embodiments the organic diamine is m-phenylenediamine, p-phenylenediamine, 4,4'-diaminodiphenyl sulfone, 3,4'-diaminodiphenyl sulfone, 3,3'-diaminodiphenyl sulfone, or a combination comprising at least one of the foregoing.

The polyetherimides can have a melt index of 0.1 to 10 grams per minute (g/min), as measured by American Society for Testing Materials (ASTM) D1238 at 340 to 370° C., using a 6.7 kilogram (kg) weight. In some embodiments, the polyetherimide has a weight average molecular weight (Mw) of 1,000 to 150,000 grams/mole (Dalton), as measured by gel permeation chromatography, using polystyrene standards. In some embodiments the polyetherimide has an Mw of 10,000 to 80,000 Daltons. Such polyetherimides typically have an intrinsic viscosity greater than 0.2 deciliters per gram (dl/g), or, more specifically, 0.35 to 0.7 dl/g as measured in m-cresol at 25° C.

In some embodiments, the thermoplastic polymer comprises a polycarbonate. "Polycarbonate" as used herein means a polymer or copolymer having repeating structural carbonate units of formula (7)

wherein at least 60 percent of the total number of $R^1$ groups are aromatic, or each $R^1$ contains at least one $C_{6-30}$ aromatic group. Specifically, each $R^1$ can be derived from a dihydroxy compound such as an aromatic dihydroxy compound of formula (8) or a bisphenol of formula (9).

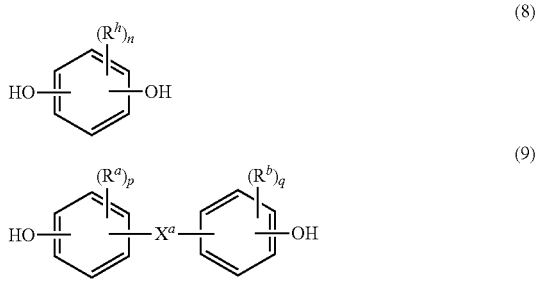

In formula (8), each $R^h$ is independently a halogen atom, for example bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4.

In formula (9), $R^a$ and $R^b$ are each independently a halogen, $C_{1-12}$ alkoxy, or $C_{1-12}$ alkyl, and p and q are each independently integers of 0 to 4, such that when p or q is less than 4, the valence of each carbon of the ring is filled by hydrogen. In an embodiment, p and q is each 0, or p and q is each 1, and $R^a$ and $R^h$ are each a $C_{1-3}$ alkyl group, specifically methyl, disposed meta to the hydroxy group on each arylene group. $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group, for example, a single bond, —O—, —S—, —S(O)—, —S(O)$_2$—, —C(O)—, or a $C_{1-18}$ organic group, which can be cyclic or acyclic, aromatic or non-aromatic, and can further comprise heteroatoms such as halogens, oxygen, nitrogen, sulfur, silicon, or phosphorous. For example, $X^a$ can be a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula —C(=$R^e$)— wherein $R^e$ is a divalent $C_{1-12}$ hydrocarbon group.

Some illustrative examples of dihydroxy compounds that can be used are described, for example, in WO 2013/175448 A1, US 2014/0295363, and WO 2014/072923. Specific dihydroxy compounds include resorcinol, 2,2-bis(4-hydroxyphenyl) propane ("bisphenol A" or "BPA"), 3,3-bis(4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl)cyclohexane, and 1,1-bis(4-hydroxy-3-methylphenyl)-3,3,5-trimethylcyclohexane (isophorone bisphenol).

Generally, organic solvents suitable for use with the process disclosed herein have the combination of the following features. The thermoplastic polymer (e.g., polyetherimide or polycarbonate) is soluble in the organic solvent, the solvent has a boiling point that is less than 100° C., and the organic solvent is immiscible with water. The organic solvent can include combinations comprising at least two organic solvents. The organic solvent can comprise methylene chloride, chloroform, dichloroethane, or a combination comprising at least one of the foregoing. In some embodiments, the organic solvent is methylene chloride.

The first solution is combined with the second solution comprising an aqueous solvent and a surfactant, and optionally agitated to form the emulsion. In some embodiments, the aqueous solvent is water, preferably deionized water. In some embodiments, the aqueous solvent can be an aqueous buffered solution. The aqueous solvent can have a pH of 1 to 12, preferably 4 to 8. The water can be maintained at a temperature of 5 to 70° C., or 10 to 60° C., or 15 to 60° C., or 20 to 60° C., or 25 to 60° C. In some embodiments, combining the first and second solutions comprises agitating the mixture, for example using a high shear mixer, at a speed of greater than 3,000 rotations per minute (rpm), preferably 4,000 to 20,000 rpm, more preferably 4,000 to 10,000 rpm.

In some embodiments, the surfactant comprises a biopolymer, for example gelatin, carrageenan, pectin, soy protein, lecithin, casein, collagen, albumin, gum arabic, agar, protein, cellulose and derivatives thereof, a polysaccharide and derivatives thereof, starch and derivatives thereof, or the like, or a combination comprising at least one of the foregoing, preferably gelatin. Gelatin is a product obtained by the partial hydrolysis of collagen derived from the skin, white connective tissue, and bones of animals. It is a derived protein comprising various amino acids linked between adjacent imino and carbonyl groups to provide a peptide bond. The amino acid combinations in gelatin provide amphoteric properties, which are responsible for varying isoelectric values, depending somewhat upon the methods of processing. Important physical properties of gelatin such as solubility, swelling, and viscosity show minimum values at the isoelectric point. In some embodiments, the gelatin can be a recombinant gelatin or a plant-based gelatin.

The gelatin surfactant can comprise type A gelatin, type B gelatin, or a combination comprising at least one of the foregoing. Type A gelatin results from acid pretreatment (swelling of the raw material in the presence of acid) and is generally made from frozen pork skins treated in dilute acid (HCl, $H_2SO_3$, $H_3PO_4$, or $H_2SO_4$) at a pH of 1 to 2 for 10 to 30 hours, after which it is water washed to remove excess acid, followed by extraction and drying in the conventional manner. Type B gelatin results from alkali pretreatment (swelling of the raw material in the presence of an alkali) and is generally made from ossein or hide stock which is treated in saturated lime water for 3 to 12 weeks, after which the lime is washed out and neutralized with acid. The adjusted stock is then hot water extracted and dried as with type A. Dry bone is cleaned, crushed, and treated for 10 to 14 days with 4 to 7% HCl to remove the minerals (principally tricalcium phosphate) and other impurities before reaching the stage known as ossein. Dry bone is 13 to 17% gelatin whereas dry ossein is 63 to 70% gelatin. Type A gelatin is characterized by an isoelectric zone between pH 7 and 9, whereas type B gelatin has an isoelectric zone between pH 4.7 and 5.0. Thus the ionic character of the gelatin when used as a surfactant can be selected based on the pH of the second solution. Relative to each other, type A gelatin has less color, better clarity, more brittleness in film form and is faster drying than type B. In some embodiments, the gelatin is type B gelatin.

In other embodiments, the surfactant is a polymeric surfactant such as polyvinyl alcohol, polyvinyl pyrrolidone, polyethylene oxide, and the like, or a nonionic surfactant with a molecular weight greater than about 150 and having a polyethylene chain. For example, the polyethylenic nonionic surfactant can be $C_{8-22}$ aliphatic alcohol ethoxylate having about 1 to about 25 mol of ethylene oxide and having have a narrow homolog distribution of the ethylene oxide ("narrow range ethoxylates") or a broad homolog distribution of the ethylene oxide ("broad range ethoxylates"); and preferably $C_{10\text{-}20}$ aliphatic alcohol ethoxylates having about 2 to about 18 mol of ethylene oxide. Examples of commercially available nonionic surfactants of this type are TERGITOL 15-S-9 (a condensation product of $C_{11\text{-}15}$ linear secondary alcohol with 9 moles ethylene oxide), TERGITOL 24-L-NMW (a condensation product of $C_{12\text{-}14}$ linear primary alcohol with 6 moles of ethylene oxide) with a narrow molecular weight distribution from Dow Chemical Company. This class of product also includes the GENAPOL brands of Clariant GmbH. Other nonionic surfactants that can be used include polyethylene, polypropylene, and polybutylene oxide condensates of $C_{6\text{-}12}$ alkyl phenols, for example compounds having 4 to 25 moles of ethylene oxide per mole of $C_{6\text{-}12}$ alkylphenol, preferably 5 to 18 moles of ethylene oxide per mole of $C_{6\text{-}12}$ alkylphenol. Commercially available surfactants of this type include IGEPAL CO-630, TRITON X-45, X-114, X-100 and X102, TERGITOL TMN-10, TERGITOL TMN-100X, and TERGITOL TMN-6 (all polyethoxylated 2,6,8-trimethyl-nonylphenols or mixtures thereof) from Dow Chemical Corporation, and the Arkopal-N products from Hoechst AG. Still others include the addition products of ethylene oxide with a hydrophobic base formed by the condensation of propylene oxide with propylene glycol. The hydrophobic portion of these compounds preferably has a molecular weight between about 1500 and about 1800 Daltons. Commercially available examples of this class of product are the Pluronic brands from BASF and the Genapol PF trademarks of Hoechst AG. The addition products of ethylene oxide with a reaction product of propylene oxide and ethylenediamine can also be used. The hydrophobic moiety of these compounds consists of the reaction product of ethylenediamine and excess propylene oxide, and generally has a molecular weight of about 2500 to about 3000 Daltons. This hydrophobic moiety of ethylene oxide is added until the product contains from about 40 to about 80 wt % of polyoxyethylene and has a molecular weight of about 5000 to about 11,000 Daltons. Commercially available examples of this compound class are the TETRONIC brands from BASF and the Genapol PN trademarks of Hoechst AG. In some embodiments, the nonionic surfactant is a $C_{6\text{-}12}$ alkyl phenol having 4 to 25 moles of ethylene oxide per mole of $C_{6\text{-}12}$ alkylphenol, preferably 5 to 18 moles of ethylene oxide per mole of $C_{6\text{-}12}$ alkylphenol.

In some embodiments, the surfactant can be a nonionic surfactant comprising a sorbitol derivative, for example a sorbitan ester, or a polyethoxylated sorbitan ester. Examples of commercially available nonionic surfactants of this type are the partial esters of common fatty acids and hexitol anhydrides derived from sorbitol, including SPAN 20 (containing a residue of lauric acid), SPAN 40 (containing a residue of palmitic acid), and SPAN 80 (containing a residue of oleic acid). Suitable polyethoxylated sorbitan esters include TWEEN 20, TWEEN 40, TWEEN 60, TWEEN 65, and TWEEN 80, each of which is commercially available from ICI Americas, Inc. of Wilmington, Del. The TWEEN surfactants are each mixtures of various polyoxyethylene fatty acid esters in liquid form. For example, TWEEN 20 comprises polyoxyethylene (POE) esters of about 60 wt % lauric acid (dodecanoic acid); about 18% myristic acid (tetradecanoic acid); about 7% caprylic acid (octanoic acid) and about 6% capric acid (decanoic acid). TWEEN 40 generally comprises POE esters of about 90% palmitic acid (hexadecanoic acid). TWEEN 60 generally comprises POE esters of about 49% stearic acid (octadecanoic acid) and about 44% palmitic acid. TWEEN 80 generally comprises POE esters of about 69% oleic acid (cis-9-octadecanoic acid); about 3% linoleic acid (linoleic acid); about 3% linolenic acid (9,12,15-octadecatrienoic acid); about 1% stearic acid and about 1% palmitic acid.

In some embodiments, the surfactant can include an ionic surfactant, preferably sodium lauroyl sarcosinate, also known as sarkosyl.

In some embodiments, the surfactant of the second solution excludes sodium dodecyl benzene sulfonate, sodium lauryl sulfate, or a combination comprising at least one of the foregoing, preferably the surfactant of the second solution excludes sodium dodecyl benzene sulfonate.

In some embodiments, the emulsion comprises the thermoplastic polymer in an amount of 10 to 30 wt %, preferably 15 to 25 wt %, more preferably 17 to 25 wt %, even more preferably 19 to 25 wt %, based on the total weight of thermoplastic polymer and organic solvent. In some embodiments, the emulsion comprises water in a water to organic solvent weight ratio of greater than or equal to 0.4, preferably 0.5 to 3, more preferably 0.5 to 1.5, even more preferably 0.8 to 1.25. In some embodiments, the emulsion comprises the surfactant in a surfactant to thermoplastic polymer weight ratio of greater than or equal to 0.005, preferably 0.005 to 0.1, more preferably 0.009 to 0.05, even more preferably 0.01 to 0.05.

The resulting emulsion is transferred into a receiving water. The receiving water can be deionized water, an aqueous buffered solution, or water having a pH of 1 to 12. In some embodiments, the receiving water optionally comprises a surfactant. The surfactant present in the receiving water can be the same or different as the surfactant of the second solution. In some embodiments, the surfactant present in the receiving water can be sodium dodecyl benzene sulfonate, sodium lauryl sulfate, or a combination comprising at least one of the foregoing, preferably sodium dodecyl benzene sulfonate. When present, the surfactant in the receiving water can be in an amount of 0.01 to 3 wt %, or 0.01 to 1 wt %, or 0.1 to 0.5 wt % based on the total weight of the receiving water. The receiving water is maintained at a temperature of greater than or equal to 50° C., preferably 50 to 100° C., more preferably 55 to 95° C., even more preferably 55 to 85° C. to remove the organic solvent and form an aqueous dispersion comprising a plurality of thermoplastic polymer particles dispersed in water.

In some embodiments, the emulsion can be transferred to the receiving water in a dropwise manner. In some embodiments, the emulsion can be transferred to the receiving water by spraying through a nozzle. In some embodiments, the emulsion can be heated up to, below, or above the boiling point of the emulsion prior to transferring to the receiving water. After transferring the emulsion to the receiving water, the organic solvent can be removed (e.g., by distillation) to form an aqueous polymer dispersion.

The process further comprises recovering the thermoplastic polymer particles. Recovering can be by filtering the dispersion. Filtering can include one or more steps, each step independently using a filter having a desired pore size. For example, recovering the particles can include filtering the dispersion through a filter having an average pore size of 150 μm to remove large particles (e.g., particles having a diameter greater than 150 μm). The filtrate, including particles having a diameter of less than 150 μm, can subsequently be filtered, for example using a filter having an average pore size of 1 μm to provide a wet cake comprising the thermoplastic polymer particles. In some embodiments, the wet cake can be washed one or more times with water, for example the wet cake can be washed with deionized water at a temperature of 25 to 100° C. The wet particles can be washed until a desired level of residual surfactant is reached. For example, the wet particles can be washed with deionized water until the amount of residual surfactant is less than 1000 ppm, or 1 ppb to 1000 ppm, or 1 ppb to 500 ppm, or 1 ppb to 100 ppm, or 1 ppb to 1 ppm. In some embodiments, the wet cake can be dried, for example by heating, under vacuum, or a combination comprising at least one of the foregoing.

The thermoplastic polymer particles recovered from the aqueous dispersion have a D50 particle size of 20 to 100 μm, preferably 20 to 90 μm, more preferably 20 to 80 μm, even more preferably 30 to 70 μm. In some embodiments, the particles have a particle size distribution span of less than 2, preferably less than 1.75, more preferably less than 1.5. In some embodiments, the particles have a particle size distribution span of 0.8 to 2, or 0.9 to 1.75, or 1 to 1.50. In some embodiments, the thermoplastic polymer particles have a bulk density of greater than 0.5 grams per cubic centimeter (g/cm$^3$), preferably greater than 0.6 g/cm$^3$r, more preferably greater than 0.7 g/cm$^3$.

Thermoplastic polymer particles having a diameter of less than 150 μm are recovered in a yield greater than 85%, preferably greater than 90%, more preferably greater than 95%, even more preferably greater than 97%.

In some embodiments, the thermoplastic polymer particles can be mixed with a flow promoter in order to achieve a desired flowability. In some embodiments, the polymer particles can be mixed with a flow promoter in an amount of 0.001 to 1 wt %, or 0.005 to 1 wt %, preferably 0.05 to 0.5 wt %, more preferably 0.05 to 0.25 wt %, based on the weight of the polymer particles. Mixing the particles with the flow promoter can provide particles having a flowability of greater than or equal to 4, more preferably greater than or equal to 10. In some embodiments, the flow promoter comprises an unmodified fumed metal oxide, a hydrophobic fumed metal oxide, a hydrophilic fumed metal oxide, hydrated silica, amorphous alumina, glassy silica, glassy phosphate, glassy borate, glassy oxide, titania, talc, mica, kaolin, attapulgite, calcium silicate, magnesium silicate, or a combination comprising at least one of the foregoing. In some embodiments, the flow promoter comprises fumed silica, fumed aluminum oxide, or a combination comprising at least one of the foregoing. In some embodiments, the flow promoter preferably comprises fumed silica. The flow promoter can optionally be a surface modified flow promoter, for example, the flow promoter can comprise hydrophobic or hydrophilic surface modification. Examples of suitable flow promoters that are commercially available include those available under the names SIPERNAT and AEROSIL from Evonik, CAB-O-SIL and CAB-O-SPERSE hydrophilic fumed silica, CAB-O-SIL and CAB-O-SPERSE hydrophobic fumed silica, and CAB-O-SPERSE fumed metal oxide, each available from Cabot Corporation.

In some embodiments, first solution comprising the thermoplastic polymer and the organic solvent can optionally further comprise one or more additives known in the art, with the proviso that the additive(s) are selected so as to not significantly adversely affect the desired properties of the resulting thermoplastic polymer particles. Such additives include a particulate inorganic filler (such as glass, ceramic, or metal, e.g., ceramic particles), a particulate organic filler (such as carbon or a crosslinked polymer), conductive filler (such as graphite or single-walled or multi-walled carbon nanotubes), an inorganic filler, organic fiber, inorganic fiber, conductive ink, antioxidant, heat stabilizer, light stabilizer, ultraviolet (UV) light stabilizer, UV absorbing additive, NIR absorbing additive, IR absorbing additive, laser marking dye, plasticizer, lubricant, release agent (such as a mold release agent), antistatic agent, anti-fog agent, antimicrobial agent, colorant (e.g, a dye or pigment), surface effect additive, radiation stabilizer, flame retardant, anti-drip agent (e.g., a PTFE-encapsulated styrene-acrylonitrile copolymer (TSAN)), a fragrance, or a combination comprising at least one of the foregoing. In general, the additives are used in the amounts known to be effective. For example, the total amount of the additive composition (other than any filler) can be 0.001 to 10.0 wt %, or 0.01 to 5 wt %, each based on the total weight of the first solution.

For example, a combination of a heat stabilizer, mold release agent, and ultraviolet light stabilizer can be used. Pigments, surface effect agents, and nanosized fillers are also specifically contemplated, as such materials can be readily co-dispersed with the polymers, or pre-combined with the polymers. In some embodiments, the first solution preferably comprises a dye or a pigment, for example a near infrared (NIR) dye in an amount of 0.001 to 10 wt %, or 0.01 to 10 wt %, or 0.01 to 1 wt %, based on the total weight of the first solution.

Advantageously, the one or more additives incorporated into the first solution can be incorporated into the resulting thermoplastic polymer particles. For example, the thermoplastic polymer particles can comprise an additive in an amount of 0.001 to 10.0 wt %, or 0.01 to 5 wt %, based on the weight of the thermoplastic polymer particles. In an embodiment, the thermoplastic polymer particles can comprise a dye or pigment in an amount of 0.001 to 10.0 wt %, or 0.01 to 5 wt %, based on the weight of the thermoplastic polymer particles.

In some embodiments, the process for the manufacture of thermoplastic polymer particles can provide particles having a sphericity of greater than 0.7, preferably greater than 0.8, more preferably 0.9, even more preferably greater than 0.95. For example, the sphericity can be 0.7 to 1, or 0.8 to 1, or 0.9 to 1, or 0.95 to 1. The sphericity is defined by $((6*Vp)/(Dp*Ap))$, where Vp is the volume of the particle, Dp is the diameter of the particle and Ap is the surface area of the particle.

In some embodiments, a process for the manufacture of polycarbonate particles is disclosed. The process comprises combining a first solution comprising a polycarbonate and an organic solvent with a second solution comprising an aqueous solvent and a surfactant comprising gelatin to provide an emulsion; transferring the emulsion into a receiving water at a temperature of 50 to 100° C. to remove the organic solvent and form an aqueous dispersion comprising a plurality of polycarbonate particles dispersed in water; and recovering polycarbonate particles having a D50 of 20 to 80 μm. The emulsion comprises water in a water-to-organic solvent weight ratio of 0.5 to 1, the polycarbonate in an amount of 15 to 25 wt %, based on the total weight of polycarbonate and organic solvent; and the surfactant in a surfactant-to-polycarbonate weight ratio of 0.01 to 0.04. The polycarbonate particles having a diameter of less than 150 μm prepared according to the above method are recovered in a yield greater than or equal to 90%.

In an embodiment, a process for the manufacture of polyetherimide particles is disclosed. The process comprises combining a first solution comprising a polyetherimide and an organic solvent with a second solution comprising an aqueous solvent and a surfactant comprising gelatin to provide an emulsion; transferring the emulsion into a receiving water at a temperature of 50 to 100° C. to remove the organic solvent and form an aqueous dispersion comprising a plurality of polyetherimide particles dispersed in water; and recovering polycarbonate particles having a D50 of 20 to 80 µm. The emulsion comprises water in a water-to-organic solvent weight ratio of 0.5 to 1, the polyetherimide in an amount of 15 to 25 wt %, based on the total weight of polyetherimide and organic solvent; and the surfactant in a surfactant-to-polyetherimide weight ratio of 0.01 to 0.04. The polyetherimide particles having a diameter of less than 150 µm prepared according to the above method are recovered in a yield greater than or equal to 90%.

Thermoplastic polymer particles represent another aspect of the present disclosure. The thermoplastic polymer particles can be prepared according to the above-described method.

In an embodiment, thermoplastic polymer particles are disclosed independent of their method of preparation. The thermoplastic polymer particles comprise a thermoplastic polymer and gelatin. The thermoplastic polymer particles can comprise polycarbonate, a polyetherimide, a polyimide, a polysulfone, a polyethersulfone or a combination comprising at least one of the foregoing, preferably a polycarbonate, a polyetherimide, or a combination comprising at least one of the foregoing. The gelatin can be a type A gelatin or a type B gelatin, preferably type B gelatin. The thermoplastic polymer particles have a D50 of 20 to 80 µm. In some embodiments, the thermoplastic polymer particles can have a maximum diameter of less than 150 µm. The gelatin is present in the particles in an amount of less than 1000 ppm, preferably 1 ppb to 1000 ppm, more preferably 1 ppb to 500 ppm, even more preferably 1 ppb to 100 ppm, even more preferably still 1 ppb to 1 ppm. In some embodiments, the particles have a sphericity of greater than 0.7, preferably greater than 0.8, more preferably 0.9, even more preferably greater than 0.95. For example, the sphericity can be 0.7 to 1, or 0.8 to 1, or 0.9 to 1, or 0.95 to 1. The sphericity is defined by $((6*Vp)/(Dp*Ap))$, where Vp is the volume of the particle, Dp is the diameter of the particle and Ap is the surface area of the particle.

The particles can be used in many applications where particulate, high performance polymers are used, for example in coating applications and additive manufacturing. Therefore an article prepared from the thermoplastic polymer particles represents another aspect of the present disclosure. Advantageously, the thermoplastic polymer particles described herein can be used for the manufacture of articles including molded articles, extruded articles, powder bed fused articles, coatings, coated articles, films, and the like. The particles described herein can flow more readily due to their spherical shape, and, as described above, the particle flowability can be improved by addition of a flow promoter. Using a specific combination of optimized process parameters, thermoplastic polymer particles having a D50 of 20 to 100 µm can be obtained in high yields. Accordingly, an improved process for the preparation of polymer particles is provided.

Further information is provided by the following non-limiting examples.

EXAMPLES

Materials for the following examples are listed in Table 1.

TABLE 1

| Abbreviation | Chemical Description | Source |
| --- | --- | --- |
| PEI | Polyetherimide made from the reaction of bisphenol A dianhydride with meta-phenylene diamine, having a glass transition temperature of 217° C., available as ULTEM 1010. | SABIC |
| PC | Bisphenol-A polycarbonate obtained as Lexan C107 | SABIC |
| Gelatin | Type B Gelatin | Fisher Scientific |
| Fumed silica | A medium surface area fumed silica which has been surface modified with polydimethylsiloxane, obtained as CAB-O-SIL TS-720 | Cabot |
| ADS 1075A | 4,4',4''-tris(N,N-phenyl-3-methylphenylamino)triphenyl ammonium hexafluoroantimonate | American Dye Source, Inc. |

Emulsion Preparation

In general, emulsions were prepared by dissolving a thermoplastic polymer in an organic solvent (e.g., methylene chloride) using a shaker table to provide a polymer solution with no visibly suspended particles. Water and surfactant are added to the polymer solution. The resulting mixture was emulsified with low shear agitation (e.g., 5,000 rpm) or high shear agitation (e.g., 7,000 rpm) for five minutes to provide a stable emulsion.

Aqueous Polymer Slurry Formation

The emulsion was transferred to a separate container having water (and optionally surfactant) maintained at a temperature of at least 60° C. The organic solvent was captured using a condenser with cold circulating water. The emulsion can be transferred to the separate container in a dropwise manner, or through a nozzle which can produce fine droplets. Following the complete removal of the organic solvent, the resulting aqueous polymer slurry was filtered through a 150 µm sieve. The polymer particles having a size greater than 150 µm which did not pass through the sieve were washed with water and dried. The aqueous polymer slurry which passed through the 150 µm sieve was filtered through a 1 µm filter using vacuum, washed with water at a temperature of at least 60° C., and the resulting wet cake was dried at 105° C. under vacuum for two days.

Polymer Particle Characterization

The particle size distribution was measured in water using laser diffraction technology on a Mastersizer 3000 from Malvern. The dried polymer powder was slurried in water containing 3000 parts per million (ppm) of an anionic surfactant, and sonicated for five minutes. The slurry was added to the measurement reservoir containing water. The volume-based particle size distribution was then measured. "D50" corresponds to 50% of the particles (based on volume) below a certain diameter. The particle size analysis can also be done directly from aqueous polymer dispersion without need for re-dispersing in water.

The particle morphology was analyzed by scanning electron microscopy (SEM).

Examples 1-4

Two surfactants were used to prepare the aqueous polymer dispersions of polycarbonate and the effects of each of the surfactants were compared. The two surfactants tested were sodium dodecyl benzene sulfonate (SDBS) and type B Gelatin.

50 grams of PC was dissolved in 200 grams of methylene chloride to produce a 20% polymer solution. To this, 200 grams of deionized water was added with 1 gram of surfactant. The type of surfactant used for each example is given in Table 2. The samples were homogenized using an IKA homogenizer (IKA T25 Ultra-Turrax with an 18 G tool) for 5,000 rpm as well as 7,000 rpm for five minutes. 50 grams of emulsified samples were transferred dropwise to another vessel containing 200 grams of deionized water and 0.8 grams of SDBS surfactant which was maintained at a temperature of at least 70° C. After the full transfer, the aqueous dispersion was held at a temperature of at least 70° C. for ten minutes to remove most of the organic solvent. The aqueous dispersion thus obtained was passed through a 150 μm sieve. The particles greater than 150 μm were washed well with deionized water multiple times, isolated, and dried in vacuum oven at 105° C. for two days. Based on the polymer present in 50 grams of emulsion, the yield of polymer particles having a diameter of less than 150 μm was calculated and is given in Table 2. The aqueous polymer dispersion which passed through the 150 μm sieve was measured for particle size distribution and the results are given in Table 2. The particle sizes (D10, D50, D90, and D100) provided in Table 2 are reported in micrometers (μm).

TABLE 2

| Example | Surfactant | RPM | D10 | D50 | D90 | D100 | Span | Yield of particles <150 μm |
|---|---|---|---|---|---|---|---|---|
| 1* | SDBS | 5000 | 7.6 | 20.4 | 50.6 | 163 | 2.118 | 27% |
| 2* | SDBS | 7000 | 7.78 | 17.9 | 44.1 | 163 | 2.023 | 73% |
| 3 | Gelatin | 5000 | 16.0 | 30.8 | 52.0 | 76.0 | 1.168 | 99.0% |
| 4 | Gelatin | 7000 | 12.4 | 22.1 | 36.4 | 54.0 | 1.088 | 99.5% |

From the results provided in Table 2, it can be seen that the process yield is significantly reduced when SDBS was used as the surfactant, with Examples 1 and 2 having yields of particles having a size less than 150 μm of 27 and 73%, respectively. In contrast, when type B gelatin was used as a surfactant, as in Examples 3 and 4, the process yield of particles having a size less than 150 μm was greater than or equal to 99%. Furthermore, the span of the particle size distribution was also reduced significantly when type B gelatin was used. The "span" is defined as (D90–D10)/D50.

Examples 5-44

In order to understand the effect of gelatin in the formulation, a design of experiment was constructed using D-optimal response surface design as given in Table 3A. The polymer concentration (conc.) in solvent (Eq. 1), water ratio (Eq. 2), and surfactant ratio (Eq. 3) were selected as factors.

Polymer conc. (solids %)=(Polymer weight, g)/
[(Polymer weight, g)+(solvent weight, g)]   (Eq. 1)

Water ratio=(Water weight, g)/(organic solvent weight, g)   (Eq. 2)

Surfactant ratio=(Surfactant weight, g)/(polymer weight, g)   (Eq. 3)

PC was dissolved in methylene chloride to form a polymer solution. A known amount of deionized water and gelatin were added to the polymer solution. The resulting mixture was emulsified using a hand held high shear mixer at 5,000 rpm for 5 minutes or at 7,000 rpm for 5 minutes. The results are provided in Table 3, where it can be seen that most of the formulations resulted in a stable emulsion. Due to light scattering, the emulsion appears to be "milky" in color.

50 grams of the above prepared emulsion was transferred dropwise into another vessel containing 200 grams of water and 0.8 grams of SDBS surfactant, which was maintained greater than 60° C. Both the emulsion vessel and receiving water was agitated using magnetic stirrer. After the emulsion transfer, the receiving water was further maintained at greater than 60° C. for ten minutes to remove most of the methylene chloride to produce the aqueous polymer slurry. The aqueous polymer slurry was filtered through a 150 μm filter. The polymer particles greater than 150 μm in size which did not pass through the sieve were washed well with water, isolated, and dried to get the yield of the process. The aqueous polymer slurry which passed through the 150 μm sieve was filtered through a 1 μm filter media using vacuum, washed multiple times with water at a temperature of at least 60° C. and the wet cake was dried at 105° C. under vacuum for two days. The particle size distribution (D50, based on volume, reported in micrometers, μm) of the polymer powder was evaluated using laser diffraction (Mastersizer 3000 from Malvern) and given in Table 3.

TABLE 3

| Ex. | Polymer conc., % | Water ratio | Gelatin ratio | Homogenization, rpm | D50 | Span | Yield of particles <150 μm |
|---|---|---|---|---|---|---|---|
| 5 | 18.5 | 1.00 | 0.04 | 5000 | 24 | 1.204 | 99 |
| 6 | 25 | 0.51 | 0.04 | 5000 | 25.3 | 1.447 | 92 |
| 7 | 21 | 0.25 | 0.03 | 5000 | 15.2 | 3.04 | 63 |
| 8 | 18.5 | 1.00 | 0.04 | 5000 | 24.6 | 1.206 | 97.5 |
| 9 | 15 | 0.70 | 0.03 | 5000 | 20 | 1.044 | 98 |
| 10 | 21 | 0.25 | 0.03 | 5000 | 14.2 | 1.798 | 65 |
| 11 | 25 | 0.25 | 0.01 | 5000 | 18.5 | 1.212 | 91 |
| 12 | 24.8 | 0.56 | 0.02 | 5000 | 34 | 1.352 | 94 |
| 13 | 19.2 | 0.56 | 0.04 | 5000 | 29.2 | 1.218 | 99 |
| 14 | 21 | 0.70 | 0.01 | 5000 | 41.5 | 1.519 | 82 |
| 15 | 16 | 0.63 | 0.01 | 5000 | 31.3 | 1.071 | 94.5 |
| 16 | 21 | 0.70 | 0.01 | 5000 | 33.2 | 1.178 | 97 |
| 17 | 25 | 1.00 | 0.02 | 5000 | 46.6 | 1.06 | 98.5 |
| 18 | 15 | 0.70 | 0.03 | 5000 | 19.9 | 1.092 | 98 |
| 19 | 15 | 0.25 | 0.01 | 5000 | 41.5 | 1.833 | 29 |
| 20 | 15 | 0.25 | 0.04 | 5000 | 51.5 | 1.779 | 18 |
| 21 | 16 | 0.33 | 0.03 | 5000 | 27.9 | 1.81 | 95 |

TABLE 3-continued

| Ex. | Polymer conc., % | Water ratio | Gelatin ratio | Homogenization, rpm | D50 | Span | Yield of particles <150 μm |
|---|---|---|---|---|---|---|---|
| 22 | 21 | 0.25 | 0.03 | 5000 | 14.8 | 2.139 | 87.5 |
| 23 | 25 | 1.00 | 0.04 | 5000 | 39.3 | 1.59 | 98 |
| 24 | 15 | 1.00 | 0.01 | 5000 | 47.5 | 1.135 | 72 |
| 25 | 18.5 | 1.00 | 0.04 | 7000 | 17.3 | 1.114 | 99 |
| 26 | 25 | 0.51 | 0.04 | 7000 | 18.8 | 1.294 | 99.5 |
| 27 | 21 | 0.25 | 0.03 | 7000 | 10.2 | 2.22 | 91 |
| 28 | 18.5 | 1.00 | 0.04 | 7000 | 16.8 | 1.114 | 99 |
| 29 | 15 | 0.70 | 0.03 | 7000 | 13.6 | 0.964 | 99.5 |
| 30 | 21 | 0.25 | 0.03 | 7000 | 10.4 | 1.546 | 94 |
| 31 | 25 | 0.25 | 0.01 | 7000 | 15.2 | 1.285 | 95 |
| 32 | 24.8 | 0.56 | 0.02 | 7000 | 23.5 | 1.287 | 98 |
| 33 | 19.2 | 0.56 | 0.04 | 7000 | 17.8 | 1.132 | 99 |
| 34 | 21 | 0.70 | 0.01 | 7000 | 27.2 | 1.302 | 95 |
| 35 | 16 | 0.63 | 0.01 | 7000 | 17.6 | 1.168 | 96 |
| 36 | 21 | 0.70 | 0.01 | 7000 | 22.5 | 1.105 | 98.5 |
| 37 | 25 | 1.00 | 0.02 | 7000 | 36.6 | 1.085 | 99.5 |
| 38 | 15 | 0.70 | 0.03 | 7000 | 13.3 | 1.016 | 98.5 |
| 39 | 15 | 0.25 | 0.01 | 7000 | 70.2 | 1.406 | 22 |
| 40 | 15 | 0.25 | 0.04 | 7000 | 46.8 | 2.18 | 18 |
| 41 | 16 | 0.33 | 0.03 | 7000 | 18 | 1.619 | 98.5 |
| 42 | 21 | 0.25 | 0.03 | 7000 | 12.7 | 1.951 | 91 |
| 43 | 25 | 1.00 | 0.04 | 7000 | 30 | 1.525 | 99 |
| 44 | 15 | 1.00 | 0.01 | 7000 | 32.6 | 1.484 | 63 |

The particle size D50 (based on volume) results from Examples 5-24 of Table 3 were analyzed using Design Expert software. The regression analysis produced an acceptable model with $R^2$ of 0.88 and an adjusted $R^2$ of greater than 0.83. The plot of D50 against the polymer solution concentration as well as water ratio is given in FIG. 1. The particle size (D50, based on volume) dependence on polymer solution concentration, water fraction as well as surfactant ratio is given below in equation 4.

$$D50 = 190.5 - (12.5*S) - (68.1*W) - (1971.5*G) + (5.8*S*W) - (1449.1*W*G) + (0.2*S^2) + (51980.42*G^2) \quad \text{(Eq. 4)}$$

where D50 is the volume-based diameter, S is the percent solids content (e.g., polymer concentration in solvent), W is the water ratio, and G is the gelatin (surfactant) ratio. The surfactant ratio (gelatin) was fixed at 0.01 (1% of surfactant based on polymer).

It can be seen from FIG. 1 that particle size D50 decreases when the polymer concentration increases at low water ratios. At higher water ratio, the particle size D50 increases when polymer concentration increases.

The results from Examples 25-44 of Table 3 were also analyzed using Design Expert software. The regression analysis produced an acceptable model with $R^2$ of 0.78 and an adjusted $R^2$ of 0.68. The plot of D50 against the polymer solution concentration as well as water ratio is given in FIG. 2. The particle size (D50, volume-based) dependence on polymer solution concentration, water fraction as well as surfactant ratio is given in equation 5. The surfactant ratio (gelatin) was fixed at 0.03 (3% of surfactant based on polymer).

$$D50 = 305.8 - (19.2*S) - (161.1*W) - (3371.4*G) + (7.8*S*W) + (0.3*S^2) + (60169.4*G^2) \quad \text{(Eq. 5)}$$

where D50 is the volume-based diameter, S is the percent solids content (e.g., polymer concentration in solvent), W is the water ratio, and G is the gelatin (surfactant) ratio.

Figure 2:
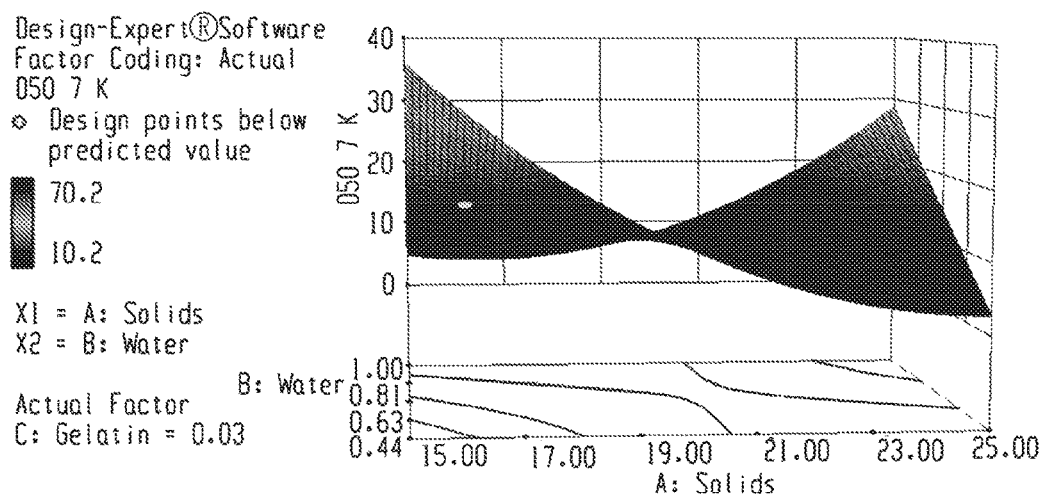
FIG. 2 shows a 3D surface area plot of D50 particle size dependence on water ratio and polymer solution concentration.

As shown in FIG. 2, particle size D50 decreases as the polymer concentration increases at low water ratios. At higher water ratios, the D50 particle size increases with polymer concentration.

It can be seen from Table 3 that at higher rpm (e.g., 7,000), the D50 is lower for most of the formulation compared to lower rpm (e.g., 5,000).

The yield (of less than 150 μm particles) of Examples 5-24, shown in Table 3 was analyzed using Design Expert software. The regression analysis produced an acceptable model with $R^2$ of 0.79 and an adjusted $R^2$ of greater than 0.67. The plot of the yield of particles having a size of less than 150 μm against the polymer solution concentration as well as water ratio is given in FIG. 3. The D50 particle size dependence on polymer solution concentration, water fraction as well as surfactant ratio is given in equation 6.

$$\text{Yield of the process} = -101.2 + (5.3*S) + (281.5*W) + (2900.6*G) - (5.7*S*W) + (2023.1*W*G) - (141.6*W^2) - (80258.1*G^2) \quad \text{(Eq. 6)}$$

where S is the percent solids content (e.g., polymer concentration in solvent), W is the water ratio, and G is the gelatin (surfactant) ratio.

Figure 3:
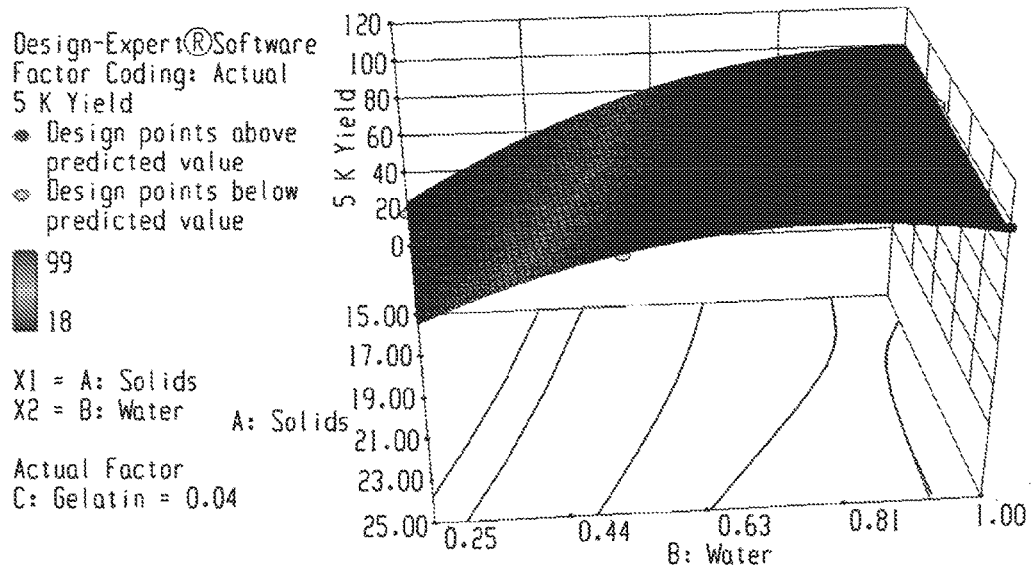
FIG. 3 shows a 3D surface area plot of yield of micronized particles of less than 150 μm dependence on water ratio and polymer solution concentration.

From FIG. 3 it can be inferred that higher water ratio results in higher yield of <150 μm particles, irrespective of polymer solution concentration, while fixing the surfactant (gelatin) concentration at 4%, based on polymer weight.

The yield of less than 150 μm particles results from Examples 25-44 of Table 3 were analyzed using Design Expert software. The regression analysis produced an acceptable model with $R^2$ of 0.86 and an adjusted $R^2$ greater than 0.75. The plot of yield of less than 150 μm particles against the polymer solution concentration as well as water ratio is given in FIG. 4. The D50 particle size dependence on polymer solution concentration, water fraction as well as surfactant ratio is given in equation 7. The surfactant ratio (gelatin) was fixed at 0.04 (4% of surfactant based on polymer).

$$\text{Yield of the process} = -337.2 + (28*S) + (273.3*W) + (4472.6*G) - (5.9*S*W) + (1725*W*G) - (0.5*S^2) - (132.9*W^2) - (107282*G^2) \quad \text{(Eq. 7)}$$

where S is the percent solids content (e.g., polymer concentration in solvent), W is the water ratio, and G is the gelatin (surfactant) ratio.

Figure 4:
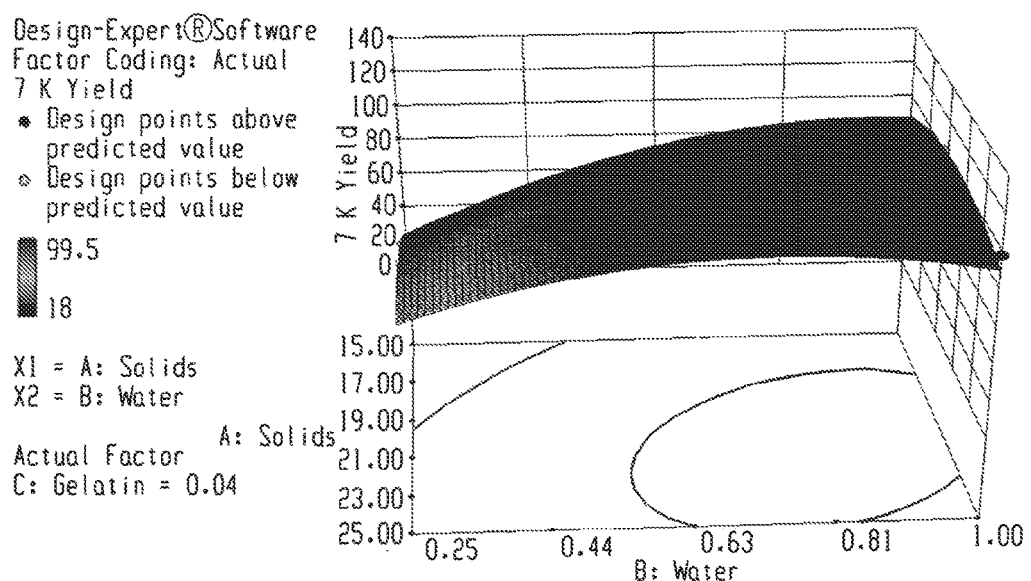
FIG. 4 shows a 3D surface area plot of yield of micronized particles of less than 150 μm dependence on water ratio and polymer solution concentration.

From FIG. 4 it can be inferred that higher water ratio results in higher yield of <150 μm particles, irrespective of polymer solution concentration, while fixing the surfactant (gelatin) concentration at 4% based on polymer weight.

It can be seen from Examples 5-24 of Table 3 that D50 particle size diameter can be tuned from 14.8 to 46.6 μm with a process yield of greater than or equal to 85%, by changing the formulation using a homogenization speed of 5,000 rpm. Similarly, from example 25-44 of Table 3, it is clear that D50 particle size diameter can be achieved with homogenization speed of 7,000 rpm from 10.2 to 36.6 μm with a process yield of greater than or equal to 85%.

Figure 5:
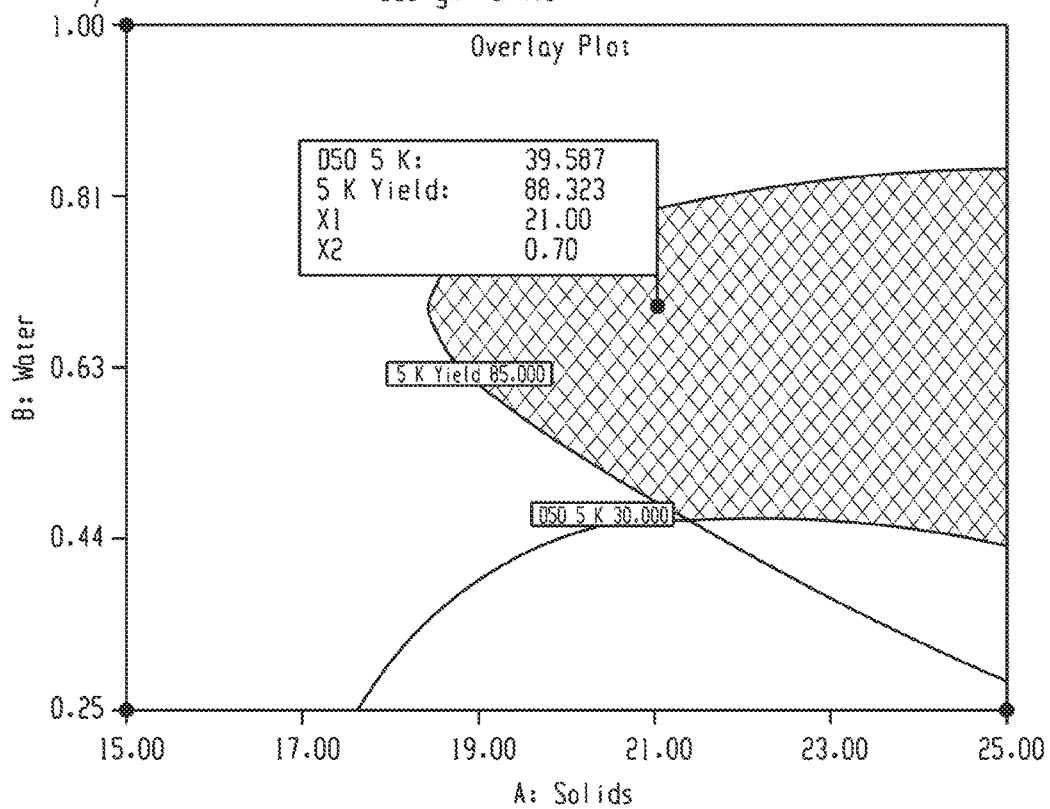
FIG. 5 shows the design space in shaded area which satisfies particle size of greater than 30 microns and a process yield of greater than 85%.

Based on equation 4, a design space was created which satisfies the below criteria: a D50 particle size diameter of greater than 30 μm and a process yield of greater than 85%. The shaded portion in FIG. 5 gives the formulation possibilities with varying polymer concentration and water ratio, which will satisfy the above criteria. In this case, the surfactant (gelatin) was fixed at 0.01 (or 1% based on polymer weight) and the homogenization rpm was 5000.

Examples 45-46

In order to understand the effect of homogenization speed to further increase the particle size diameter, a formulation equivalent to that of Examples 17 and 37 was homogenized using 3,000 and 4,000 rpm for five minutes, respectively, and compared with the same sample homogenized at 5,000 and 7,000 rpm (Examples 15 and 35, respectively). The results on the particle size and yield of the process are given in Table 4. The homogenization time for each experiment is 5 minutes. The particle sizes (D10, D50, D90, and D100) provided in Table 4 are reported in micrometers (μm).

TABLE 4

| Example | Surfactant | RPM | D10 | D50 | D90 | D100 | Span | Yield of particles, <150 μm |
|---|---|---|---|---|---|---|---|---|
| 45 | Gelatin | 3000 | 25.1 | 64.5 | 121 | 211 | 1.49 | 68% |
| 46 | Gelatin | 4000 | 23.1 | 47.6 | 81.8 | 127 | 1.24 | 99.5% |
| 17 | Gelatin | 5000 | 25.7 | 46.6 | 75.3 | 111 | 1.06 | 98.5% |
| 37 | Gelatin | 7000 | 19.6 | 36.6 | 59.3 | 86.3 | 1.08 | 99.5% |

Figure 6:
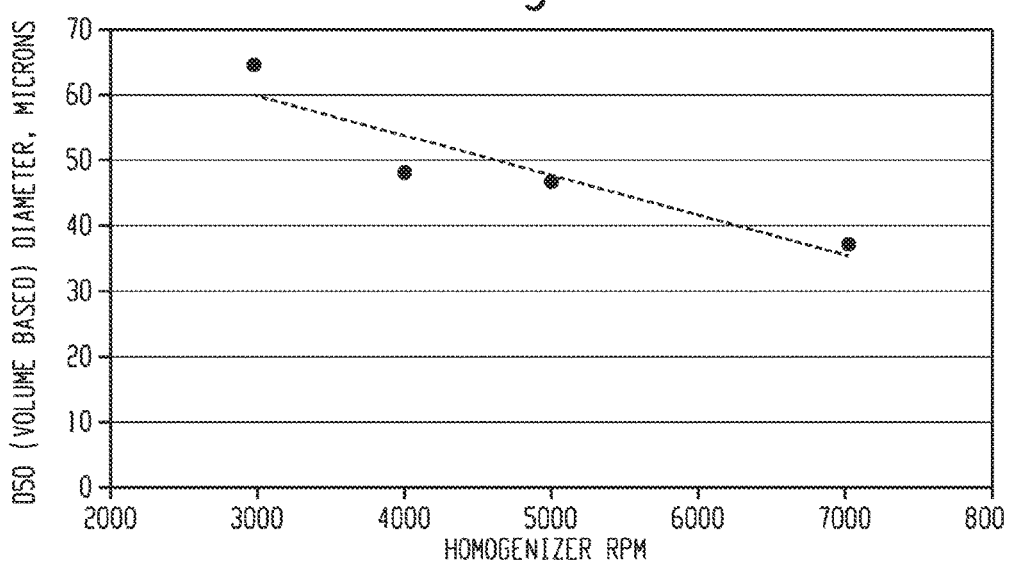
FIG. 6 shows the effect of homogenization speed (rpm) on D50 particle size of polycarbonate particles.

It can be seen from Table 4 and FIG. 6 that D50 particle size increases when the rpm used during homogenization is reduced. Interestingly, changing the rpm did not affect the yield of the process which was greater than 90% for each Example shown in Table 4, when the rpm is above 3000.

Example 47

Multiple laboratory small batches were carried out to produce 500 grams of polycarbonate powder from PC using the following formulation, wherein 56.5 grams of PC was dissolved in 200 grams of methylene chloride to form a polymer solution with 22% solids. 200 grams of deionized water and 1 gram of type B gelatin were added to the polymer solution. The resulting mixture was emulsified using a hand held high shear mixer at 6,000 rpm for 5 minutes. Methylene chloride was subsequently removed from the emulsion, filtered through a 150 μm sieve to remove bigger particles (e.g., greater than 150 μm), filtered, washed and dried, as described above. Thus obtained polycarbonate dry powders from multiple batches were mixed thoroughly to produce 500 grams of polycarbonate powder. The above emulsion process resulted in polycarbonate powders with D50 particle size of greater than 30 μm with a process yield of greater than 90%. The properties of the polycarbonate powder were evaluated and compared with polycarbonate starting material, as given in Table 5.

TABLE 5

| | PC (virgin) | Example 47 |
|---|---|---|
| Volume based diameter, μm: | | |
| D10 | | 14.9 |
| D50 | | 31.2 |
| D90 | | 57.2 |
| D100 | | 111 |
| Process yield, <150 μm powder | | >90% |
| Bulk Density, grams/cc | | 0.7 |
| Mw, Daltons | 21712 | 21783 |
| Mn, Daltons | 9962 | 9908 |
| PDI | 2.18 | 2.2 |
| Tg, ° C. | 147.8 | 147.2 |
| TGA onset temp., ° C. (nitrogen) | 514 | 526.6 |
| TGA onset temp., ° C. (air) | 494.9 | 492.5 |
| Flowability, ring shear test | Mean | Standard Deviation |
| With no modification | 2.43 | 0.38 |
| Modified with 0.05% fumed silica | 11.26 | 2.67 |
| Modified with 0.1% fumed silica | 12.69 | 0.60 |
| Modified with 0.15% fumed silica | 11.36 | 0.43 |
| Modified with 0.25% fumed silica | 14.49 | 0.29 |

From the results shown in Table 5, it can be seen that properties including molecular weight (determined by gel permeation chromatography (GPC) based on polystyrene standards eluting with methylene chloride, Tg and TGA were not significantly changed when polycarbonate is converted to powder via the above-described emulsion process. The powder flow properties were tested via ring shear tester "Jenike-Johanson" model # RST-XS with a shear cell for fine powder. The details of the equipment and description of flowability number ($ff_c$) can be found in Dietmar Schulze, Annual Transactions Of The Nordic Rheology Society, Vol. 21, Page 99, 2013. The flowability number ($ff_c$) for Example 47 was 2.5, indicating a cohesive powder. The polycarbonate powder made of Example 47 was mixed with different percentages of fumed silica (obtained from Cabot as CAB-O-SIL TS-720) and ground in a mortar and pestle and later shaken in a plastic bag to produce a better dispersion. The results shown in Table 5 indicate that the flowability of the polycarbonate powders increases with increasing content of fumed silica and reaches greater than 10 when the fumed silica loading is around 0.1% indicating free flowing powder. The free flowing characteristics can be very helpful in applications such as powder coating and additive manufacturing. The free flowing characteristics are also helpful during handling, packaging, and shipping of the powder.

Figure 7A:
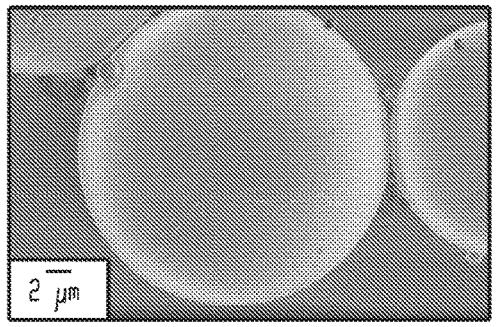
FIG. 7A shows scanning electron microscopy image of a polycarbonate powder prepared by an emulsion process at 3,000× magnification.
Figure 7B:
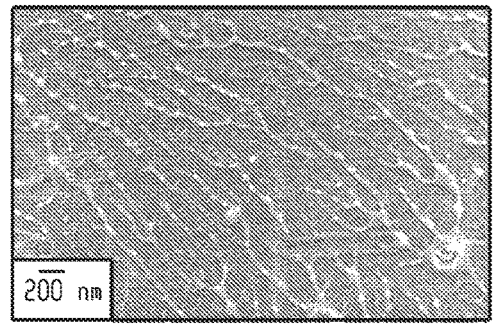
FIG. 7B shows scanning electron microscopy image of a polycarbonate powder prepared by an emulsion process at 35,000× magnification.
Figure 8A:
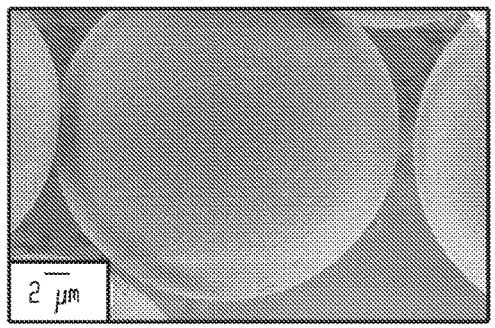
FIG. 8A shows scanning electron microscopy image of a polycarbonate powder prepared by an emulsion process and mixed with 0.05% of fumed silica at 3,000× magnification.
Figure 8B:
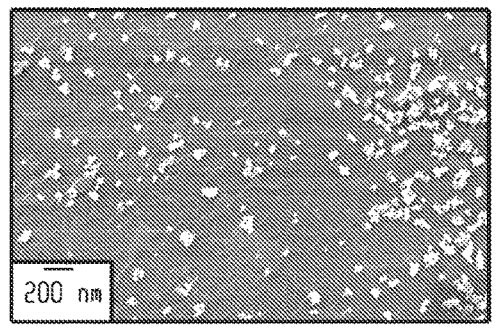
FIG. 8B shows scanning electron microscopy image of a polycarbonate powder prepared by an emulsion process and mixed with 0.05% of fumed silica at 35,000× magnification.

The SEM images of polycarbonate powders of Example 47 are shown in FIG. 7, and show the spherical morphology. Prior to imaging, the sample was coated with Pt/Pd and imaged using SEM in lens mode. FIG. 7A shows 3,000 times magnification, and FIG. 7B shows 35,000 times magnification. The scanning electron microscopy picture of Example 47 modified with 0.05% fumed silica is given in FIG. 8. Prior to imaging, the sample was coated with Pt/Pd and imaged using SEM in lens mode. FIG. 8A shows 3,000 times magnification, and FIG. 8B shows 35,000 times magnification.

It can be clearly seen that addition of flow aids such as fumed silica does not change the spherical morphology of the polycarbonate powder. It can be also seen that flow aids such as fumed silica can adhere to the polycarbonate particle surface, which (without being bound by theory) is believed to bring about the improvement in the flowability of the particles.

Examples 48-51

Formulations were also prepared using a different polymer backbone, specifically a polyetherimide (PEI).

Two surfactants were used to prepare the aqueous polymer dispersions of polyetherimide and the effects of each of the surfactants were compared. The two surfactants tested were sodium dodecyl benzene sulfonate (SDBS) and type B gelatin.

50 grams of PEI was dissolved in 200 grams of methylene chloride to produce a 20% polymer solution. To this, 200 grams of deionized water was added with 1 gram of surfactant. The type of surfactant used for each example is given in Table 6. The samples were homogenized using an IKA homogenizer (IKA T25 Ultra-Turrax with an 18 G tool) for 5,000 rpm as well as 7,000 rpm for five minutes. 50 grams of emulsified samples were transferred dropwise to another vessel containing 200 grams of deionized water and 0.8 grams of SDBS surfactant which was maintained at a temperature of at least 70° C. After the full transfer, the aqueous dispersion was held at a temperature of at least 70° C. for ten minutes to remove most of the organic solvent. The aqueous dispersion thus obtained was passed through a 150 µm sieve. The particles greater than 150 µm were washed well with deionized water multiple times, isolated, and dried in vacuum oven at 105° C. for two days. Based on the polymer present in 50 grams of emulsion, the yield of polymer particles having a diameter of less than 150 µm was calculated and is given in Table 6. The aqueous polymer dispersion which passed through the 150 µm sieve was measured for particle size distribution and the results are given in Table 6. The particle sizes (D10, D50, D90, and D100) provided in Table 6 are reported in micrometers (µm).

TABLE 6

| Example | Surfactant | RPM | D10 | D50 | D90 | D100 | Span | Yield of particles, <150 µm |
|---|---|---|---|---|---|---|---|---|
| 48* | SDBS | 5000 | 5.08 | 20.7 | 58.7 | 111 | 2.594 | 99% |
| 49* | SDBS | 7000 | 5.43 | 25.5 | 57.3 | 96.9 | 2.028 | 99% |

TABLE 6-continued

| Example | Surfactant | RPM | D10 | D50 | D90 | D100 | Span | Yield of particles, <150 µm |
|---|---|---|---|---|---|---|---|---|
| 50 | Gelatin | 5000 | 22.5 | 49.7 | 85.1 | 127 | 1.258 | 98% |
| 51 | Gelatin | 7000 | 22.1 | 42.7 | 70.4 | 102 | 1.132 | 99.5% |

From the results provided in Table 6, it can be seen that gelatin as the surfactant provides significantly larger PEI particles (D50 greater than 40 µm) and a span of less than 1.5. In contrast, SDBS provides smaller PEI particles (D50 less than 26 µm) and a span of greater than 2.0.

Examples 52-91

Additional samples were prepared varying different process parameters to understand the effect of gelatin on the PEI particles. PEI was dissolved in methylene chloride to form a polymer solution. A known amount of deionized water and type B gelatin were added to the polymer solution. The resulting mixture was emulsified using a hand held high shear mixer at 5,000 rpm for 5 minutes or 7,000 rpm for 5 minutes. Most of the formulations given in Table 7 resulted in a stable emulsion; Example 66 did not form a stable emulsion. Due to light scattering, the emulsions appear to be "milky" in color.

Next, 50 grams of the above prepared emulsion was transferred dropwise into another vessel containing 200 grams of water and 0.8 grams of SDBS surfactant, which was maintained at a temperature of greater than 60° C. Both the emulsion vessel and receiving water were agitated using magnetic stirrer. After the emulsion transfer, the receiving water was maintained at greater than 60° C. for ten minutes to remove most of the methylene chloride to produce the aqueous polymer slurry. The aqueous polymer slurry was filtered through a 150 µm filter. The polymer particles having a size greater than 150 µm which did not pass through the sieve were washed well with water, isolated, and dried to get the yield of the process. The aqueous polymer slurry which passed through the 150 µm sieve were filtered through a 1 µm filter using vacuum, washed multiple times with water at a temperature of greater than 60° C. and the wet cake was dried at 105° C. under vacuum for two days. The D50 particle size distribution of the polymer powder was evaluated using laser diffraction technology using a Mastersizer 3000 from Malvern. The results are shown in Table 7.

TABLE 7

| Ex. | Polymer conc., % | Water ratio | Gelatin ratio | Homogenization, rpm | D50, µm | Span | Yield, <150 µm |
|---|---|---|---|---|---|---|---|
| 52 | 18.5 | 1.00 | 0.04 | 5000 | 35 | 1.919 | 99.5 |
| 53 | 25 | 0.51 | 0.04 | 5000 | 43.8 | 1.448 | 99 |
| 54 | 21 | 0.25 | 0.03 | 5000 | 17.2 | 1.543 | 99.5 |
| 55 | 18.5 | 1.00 | 0.04 | 5000 | 32.6 | 1.296 | 99 |
| 56 | 15 | 0.70 | 0.03 | 5000 | 22.2 | 1.16 | 99 |
| 57 | 21 | 0.25 | 0.03 | 5000 | 12.9 | 1.502 | 99 |
| 58 | 25 | 0.25 | 0.01 | 5000 | 29.9 | 1.843 | 88 |
| 59 | 24.8 | 0.56 | 0.02 | 5000 | 52.4 | 1.438 | 92.5 |
| 60 | 19.2 | 0.56 | 0.04 | 5000 | 33.4 | 0.932 | 99.5 |
| 61 | 21 | 0.70 | 0.01 | 5000 | 68.5 | 1.279 | 90 |
| 62 | 16 | 0.63 | 0.01 | 5000 | 29.3 | 1.318 | 96 |
| 63 | 21 | 0.70 | 0.01 | 5000 | 44.9 | 1.346 | 92 |
| 64 | 25 | 1.00 | 0.02 | 5000 | 62.1 | 1.339 | 99 |
| 65 | 15 | 0.70 | 0.03 | 5000 | 19 | 1.233 | 99.8 |
| 66 | 15 | 0.25 | 0.01 | 5000 | NA | 5.182 | NA |
| 67 | 15 | 0.25 | 0.04 | 5000 | 11 | 2.775 | 99.7 |

TABLE 7-continued

| Ex. | Polymer conc., % | Water ratio | Gelatin ratio | Homogenization, rpm | D50, μm | Span | Yield, <150 μm |
|---|---|---|---|---|---|---|---|
| 68 | 16 | 0.33 | 0.03 | 5000 | 51.9 | 1.658 | 75 |
| 69 | 21 | 0.25 | 0.03 | 5000 | 12.9 | 2.344 | 99.5 |
| 70 | 25 | 1.00 | 0.04 | 5000 | 65.8 | 1.253 | 99.5 |
| 71 | 15 | 1.00 | 0.01 | 5000 | 24.5 | 2.057 | 74.1 |
| 72 | 18.5 | 1.00 | 0.04 | 7000 | 23.6 | 1.265 | 99.8 |
| 73 | 25 | 0.51 | 0.04 | 7000 | 30.9 | 1.549 | 99.9 |
| 74 | 21 | 0.25 | 0.03 | 7000 | 17.5 | 1.801 | 99 |
| 75 | 18.5 | 1.00 | 0.04 | 7000 | 24.5 | 1.241 | 99.8 |
| 76 | 15 | 0.70 | 0.03 | 7000 | 14.3 | 1.1 | 99.6 |
| 77 | 21 | 0.25 | 0.03 | 7000 | 13.7 | 2.082 | 99 |
| 78 | 25 | 0.25 | 0.01 | 7000 | 30.4 | 2.035 | 91 |
| 79 | 24.8 | 0.56 | 0.02 | 7000 | 49.3 | 1.071 | 99 |
| 80 | 19.2 | 0.56 | 0.04 | 7000 | 24.1 | 1.044 | 99.9 |
| 81 | 21 | 0.70 | 0.01 | 7000 | 46.2 | 1.317 | 97 |
| 82 | 16 | 0.63 | 0.01 | 7000 | 18.7 | 1.298 | 95 |
| 83 | 21 | 0.70 | 0.01 | 7000 | 37.3 | 1.167 | 94 |
| 84 | 25 | 1.00 | 0.02 | 7000 | 51.2 | 1.391 | 99.3 |
| 85 | 15 | 0.70 | 0.03 | 7000 | 12.4 | 1.686 | 99.8 |
| 86 | 15 | 0.25 | 0.01 | 7000 | N/A | N/A | 0.6 |
| 87 | 15 | 0.25 | 0.04 | 7000 | 7.27 | 2.268 | 99.8 |
| 88 | 16 | 0.33 | 0.03 | 7000 | 31.5 | 2.033 | 95 |
| 89 | 21 | 0.25 | 0.03 | 7000 | 8.3 | 2.37 | 99.4 |
| 90 | 25 | 1.00 | 0.04 | 7000 | 56.5 | 1.162 | 99.7 |
| 91 | 15 | 1.00 | 0.01 | 7000 | 19.9 | 2.94 | 71.44 |

It can be seen from Examples 52-71 of Table 7 that multiple formulations prepared using homogenization speeds of 5000 rpm result in D50 particle size diameters of 11.0 to 68.5 μm with a process yield of greater than or equal to 90%. Similarly, from Example 72-91 of Table 7, it is clear that a homogenization speed of 7000 rpm can provide a D50 particle size diameter of 7.27 to 56.5 μm with a process yield of greater than or equal to 90%.

The D50 particle size results from Examples 52-71 of Table 7 were analyzed using Design Expert software. The regression analysis produced an acceptable model with $R^2$ of 0.7 and an adjusted $R^2$ of greater than 0.61. The plot of D50 against the polymer solution concentration as well as water ratio is given in FIG. 9. The surfactant ratio (gelatin) was fixed at 0.01 (1% of surfactant based on polymer). The D50 particle size dependence on polymer solution concentration, water fraction as well as surfactant ratio is given in equation 8.

$$D50 = 77.5 - (2.3*S) - (121*W) - (498*G) + (7.5*S*W) \quad \text{(Eq. 8)}$$

where D50 is the volume-based diameter, S is the percent solids content (e.g., polymer concentration in solvent), W is the water ratio, and G is the Gelatin (surfactant) ratio. The surfactant ratio (gelatin B) was fixed at 0.01 (1% of surfactant based on polymer).

Figure 9:
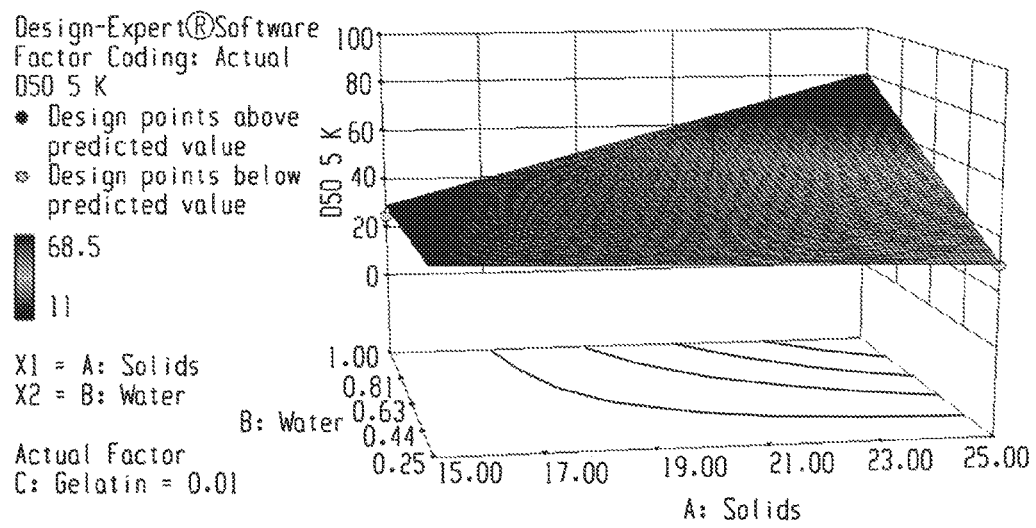
FIG. 9 shows a 3D surface area plot of D50 particle size dependence on water ratio and polymer solution concentration.

As shown in FIG. 9, D50 particle size does not change significantly with changes in polymer concentration in solvent at low water ratios. At higher water ratios, the D50 particle size D50 increases when polymer concentration increases.

The D50 particle size results from Examples 72-91 of Table 7 were analyzed using Design Expert software. The regression analysis produced an acceptable model with $R^2$ of 0.83 and an adjusted $R^2$ of 0.78. The plot of D50 against the polymer solution concentration as well as water ratio is given in FIG. 10. The surfactant ratio (gelatin) was fixed at 0.01 (1% of surfactant based on polymer). The D50 particle size dependence on polymer solution concentration, water fraction as well as surfactant ratio is given in equation 9.

$$D50 = 37.9 - (0.67*S) - (81*W) - (408*G) + (5.19*S*W) \quad \text{(Eq. 9)}$$

wherein D50, S, W, and G are as described in equation 8.

Figure 10:
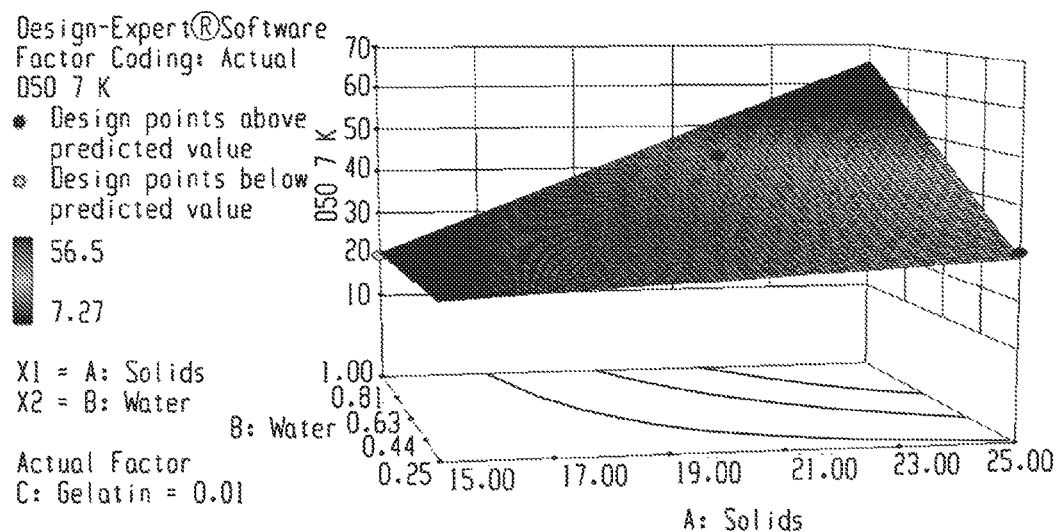
FIG. 10 shows a 3D surface area plot of D50 particle size dependence on water ratio and polymer solution concentration.

It can be seen from FIG. 10 that D50 particle size does not change significantly with changes in polymer concentration at low water ratio. At higher water ratios, the D50 particle size D50 increases when polymer concentration increases.

Incorporation of Additives in Polymer Particles

Organic molecules were incorporated in the spherical polymer particles produced according to the above-described emulsion process. 50 grams of PC and 0.05 grams of a near IR absorbing dye (4,4',4''-tris(N,N-phenyl-3-methylphenylamino)triphenyl ammonium hexafluoroantimonate, available as ADS 1075A from American Dye Source, Inc.) was dissolved in 200 grams of methylene chloride to produce a homogeneous 20% polymer solution. The polymer solution was green in color due to the absorbance of the dye. To this, 200 grams of deionized water was added, with 1 gram of type B gelatin. The sample was homogenized at 4000 rpm for five minutes. 50 grams of the emulsified samples were transferred dropwise to another flask containing 200 grams of deionized water and 0.8 grams of SDBS surfactant which was maintained at a temperature of greater than 70° C. After the complete transfer of the emulsion, the resulting aqueous polymer dispersion was maintained at a temperature of greater than 70° C. for an additional ten minutes to completely remove the organic solvent. The aqueous dispersion thus obtained was passed through a 150 μm sieve. The aqueous polymer dispersion which passed through the 150 μm sieve was filtered through a 1 μm filtration media, washed multiple times with deionized water at a temperature of greater than 70° C. to remove all residual additives. The wet powder was dried at 105° C. for 24 hours under vacuum. It was found that during filtration of the aqueous polymer dispersion, the filtrate which is predominantly water did not contain any near IR absorbing dye, which was concluded by visual observation as well as UV-Vis absorption spectra of the filtrate. The dried polycarbonate powder was green colored, indicating that the dye molecules were incorporated in the particle. The dry polycarbonate powder was dissolved in methylene chloride and the absorption spectrum was observed to match with the absorption spectrum of near IR absorbing dye dissolved in methylene chloride, confirming organic molecules that are soluble in solvents like methylene chloride can be incorporated inside the spherical polymer powder.

Residual Surfactant in Polymer Particles

Figure 11:
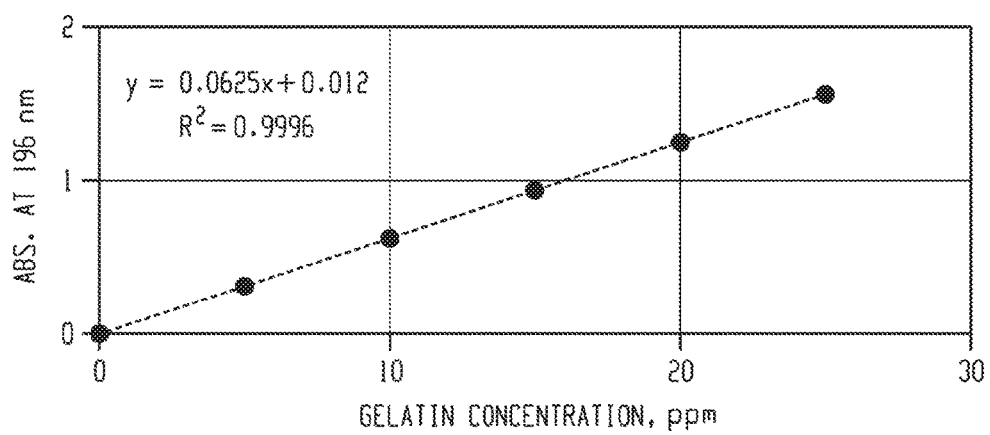
FIG. 11 shows the linear relationship between gelatin concentration (parts per million, ppm) and absorbance at 196 nanometers.

In order to quantify the residual surfactant in the powder, absorbance at 196 nanometers of the polymer particles (the absorbance maximum for the gelatin) was determined. Known amounts of type B gelatin were dissolved in deionized water and absorbance at 196 nanometers was noted. As shown in FIG. 11, a linear correlation with $R^2$ of greater than 0.99 was observed. One gram of polycarbonate dry powder (Example 47) was mixed with 10 grams of deionized water and heated at 70° C. for 30 minutes to dissolve residual gelatin present in the polycarbonate powder. The hot sample was filtered through a 0.45 µm filter. The filtrate was cooled down and absorbance at 196 nanometers was noted. Based on the linear correlation formula provided by the calibration curve of FIG. 11, it was estimated that 98 ppm of gelatin was present in the dry polycarbonate powder. As the gelatin was soluble in hot water, it is possible to wash the powder multiple times with hot water to further reduce the residual gelatin content to a desired amount.

The methods disclosed herein are further illustrated by the following embodiments, which are non-limiting.

Embodiment 1

A process for the manufacture of thermoplastic polymer particles, the process comprising combining a first solution comprising a thermoplastic polymer and an organic solvent with a second solution comprising an aqueous solvent and a surfactant to provide an emulsion; transferring the emulsion into a receiving water at a temperature of greater than or equal to 50° C., preferably 50 to 100° C., more preferably 55 to 95° C., even more preferably 55 to 85° C. to remove the organic solvent and form an aqueous dispersion comprising a plurality of thermoplastic polymer particles dispersed in the aqueous solvent; and recovering thermoplastic polymer particles having a D50 of 20 to 100 µm, preferably 20 to 90 µm, more preferably 20 to 80 µm, even more preferably 30 to 70 µm; wherein the particles having a diameter less than 150 micrometers are recovered in a yield greater than 85%, preferably greater than 90%, more preferably greater than 95%, even more preferably greater than 97%.

Embodiment 2

The process of embodiment 1, wherein the combining comprises agitating the first and second solutions at a speed of greater than 3,000 rpm, preferably 4,000 to 20,000 rpm, more preferably 4,000 to 10,000 rpm.

Embodiment 3

The process of embodiment 1 or 2, wherein the emulsion comprises the thermoplastic polymer in an amount of 10 to 30 wt %, preferably 15 to 25 wt %, more preferably 17 to 25 wt %, even more preferably 19 to 25 wt %, based on the total weight of thermoplastic polymer and organic solvent; the emulsion comprises water in a water-to-organic solvent weight ratio of greater than or equal to 0.4, preferably 0.5 to 3, more preferably 0.5 to 1.5, even more preferably 0.8 to 1.25; the emulsion comprises the surfactant in a surfactant-to-thermoplastic polymer weight ratio of greater than or equal to 0.005, preferably 0.005 to 0.1, more preferably 0.01 to 0.05.

Embodiment 4

The process of any one or more of embodiments 1 to 3, wherein the transferring comprises adding the emulsion dropwise to the receiving water.

Embodiment 5

The process of any one or more of embodiments 1 to 4, wherein the transferring comprises spraying the emulsion into the receiving water.

Embodiment 6

The process of any one or more of embodiments 1 to 5, wherein the recovering comprises filtering the aqueous dispersion to form a wet cake.

Embodiment 7

The process of embodiment 6, further comprising washing the wet cake with water, preferably with deionized water at a temperature of 25 to 100° C.

Embodiment 8

The process of embodiments 6 or 7, further comprising drying the wet cake, preferably drying the wet cake under heat, vacuum, or a combination comprising at least one of the foregoing.

Embodiment 9

The process of any one or more of embodiments 1 to 8, further comprising mixing the thermoplastic polymer particles with a flow promoter in an amount of 0.001 to 1 wt %, based on the weight of the thermoplastic polymer particles, to provide particles having a flowability of greater than or equal to 4, more preferably greater than or equal to 10.

Embodiment 10

The process of embodiment 9, wherein the flow promoter comprises an unmodified fumed metal oxide, a hydrophobic fumed metal oxide, a hydrophilic fumed metal oxide, hydrated silica, amorphous alumina, glassy silica, glassy phosphate, glassy borate, glassy oxide, titania, talc, mica, kaolin, attapulgite, calcium silicate, magnesium silicate, or a combination comprising at least one of the foregoing, preferably fumed silica, fumed aluminum oxide, or a combination comprising at least one of the foregoing, more preferably fumed silica.

Embodiment 11

The process of any one or more of embodiments 1 to 10, wherein the particles have a particle size distribution span of less than 2, preferably less than 1.75, more preferably less than 1.50.

Embodiment 12

The process of any one or more of embodiments 1 to 11, wherein the particles have a bulk density of greater than 0.5 grams per cubic centimeter, preferably greater than 0.6 grams per cubic centimeter, more preferably greater than 0.7 grams per cubic centimeter.

Embodiment 13

The process of any one or more of embodiments 1 to 12, wherein the thermoplastic polymer is a polycarbonate, a polyetherimide, a polyimide, a polysulfone, a polyethersulfone, a polyphenylene sulfone, a polyarylene ether, a polyarylate, a polyestercarbonate, or a combination comprising at least one of the foregoing, preferably a polycarbonate, a polyetherimide, or a combination comprising at least one of the foregoing.

Embodiment 14

The process of any one or more of embodiments 1 to 13, wherein the organic solvent has a boiling point that is less than 100° C., and is immiscible with water, preferably wherein the organic solvent comprises methylene chloride, chloroform, dichloroethane, or a combination comprising at least one of the foregoing, preferably methylene chloride.

Embodiment 15

The process of any one or more of embodiments 1 to 14, wherein the surfactant comprises gelatin, preferably wherein the gelatin is type A gelatin, type B gelatin, or a combination comprising at least one of the foregoing, more preferably wherein the gelatin is type B gelatin.

Embodiment 16

The process of any one or more of embodiments 1 to 15, wherein the first solution further comprises an additive comprising a particulate filler, antioxidant, heat stabilizer, light stabilizer, ultraviolet light stabilizer, UV absorbing additive, NIR absorbing additive, IR absorbing additive, plasticizer, lubricant, release agent, antistatic agent, laser marking dye, fiber, anti-fog agent, antimicrobial agent, colorant, surface effect additive, radiation stabilizer, flame retardant, anti-drip agent, or a combination comprising at least one of the foregoing, preferably a colorant; and the recovered particles comprise the additive.

Embodiment 17

A process for the manufacture of polycarbonate particles, the process comprising combining a first solution comprising a polycarbonate and an organic solvent with a second solution comprising an aqueous solvent and a surfactant comprising gelatin to provide an emulsion, wherein the emulsion comprises water in a water-to-organic solvent weight ratio of 0.5 to 1, the thermoplastic polymer in an amount of 15 to 25 wt %, based on the total weight of polycarbonate and organic solvent, and the surfactant in a surfactant-to-polycarbonate weight ratio of 0.01 to 0.04; transferring the emulsion into a receiving water at a temperature of 50 to 100° C. to remove the organic solvent and form an aqueous dispersion comprising a plurality of polycarbonate particles dispersed in water; and recovering polycarbonate particles having a diameter less than 150 micrometers and having a D50 of 20 to 80 μm, in a yield greater than or equal to 90%.

Embodiment 18

A process for the manufacture of polyetherimide particles, the process comprising combining a first solution comprising a polyetherimide and an organic solvent with a second solution comprising an aqueous solvent and a surfactant comprising gelatin to provide an emulsion, wherein the emulsion comprises water in a water-to-organic solvent weight ratio of 0.5 to 1, the thermoplastic polymer in an amount of 15 to 25 wt %, based on the total weight of polyetherimide and organic solvent, and the surfactant in a surfactant-to-polyetherimide weight ratio of 0.01 to 0.04; and transferring the emulsion into a receiving water at a temperature of 50 to 100° C. to remove the organic solvent and form an aqueous dispersion comprising a plurality of polyetherimide particles dispersed in water; and recovering polyetherimide particles having a diameter less than 150 micrometers and having a D50 of 20 to 80 μm, in a yield greater than or equal to 90%.

Embodiment 19

Thermoplastic polymer particles made by the method of any one or more of embodiments 1 to 18.

Embodiment 20

Thermoplastic polymer particles comprising a thermoplastic polymer and gelatin, wherein the thermoplastic polymer particles have a D50 of 20 to 100 μm; and gelatin is present in an amount of less than 1000 ppm, preferably 1 ppb to 1000 ppm, more preferably 1 ppb to 500 ppm, even more preferably 1 ppb to 100 ppm.

Embodiment 21

The thermoplastic polymer particles of embodiments 19 or 20, wherein the particles have a sphericity of greater than 0.7, preferably greater than 0.8, more preferably 0.9, even more preferably greater than 0.95.

Embodiment 22

An article prepared from the thermoplastic polymer particles of any one or more of embodiments 19 to 21.

In general, the methods and compositions can alternatively comprise, consist of, or consist essentially of, any appropriate components or steps herein disclosed. The methods and compositions can additionally, or alternatively, be formulated so as to be devoid, or substantially free, of any components, materials, ingredients, adjuvants or species used in the prior art compositions or that are otherwise not necessary to the achievement of the function and/or objectives of the present claims.

All ranges disclosed herein are inclusive of the endpoints, and the endpoints are independently combinable with each other. "Or" means "and/or". "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. Reference throughout the specification to "another embodiment", "an embodiment", and so forth, means that a particular element described in connection with the embodiment is included in at least one embodiment described herein, and may or may not be present in other embodiments. In addition, it is to be understood that the described elements can be combined in any suitable manner in the various embodiments.

As used herein, the term "hydrocarbyl" includes groups containing carbon, hydrogen, and optionally one or more heteroatoms (e.g., 1, 2, 3, or 4 atoms such as halogen, O, N, S, P, or Si). "Alkyl" means a branched or straight chain, saturated, monovalent hydrocarbon group, e.g., methyl, ethyl, i-propyl, and n-butyl. "Alkylene" means a straight or branched chain, saturated, divalent hydrocarbon group (e.g., methylene (—$CH_2$—) or propylene (—$(CH_2)_3$—)). "Alkenyl" and "alkenylene" mean a monovalent or divalent, respectively, straight or branched chain hydrocarbon group having at least one carbon-carbon double bond (e.g., ethenyl (—HC=$CH_2$) or propenylene (—HC($CH_3$)=$CH_2$—). "Alkynyl" means a straight or branched chain, monovalent hydrocarbon group having at least one carbon-carbon triple bond (e.g., ethynyl). "Alkoxy" means an alkyl group linked via an oxygen (i.e., alkyl-O—), for example methoxy, ethoxy, and sec-butyloxy. "Cycloalkyl" and "cycloalkylene" mean a monovalent and divalent cyclic hydrocarbon group, respectively, of the formula —$C_nH_{2n-x}$ and —$C_nH_{2n-2x}$— wherein x is the number of cyclization(s). "Aryl" means a monovalent, monocyclic, or polycyclic aromatic group (e.g., phenyl or naphthyl). "Arylene" means a divalent, monocyclic or polycyclic aromatic group (e.g., phenylene or naphthylene). The prefix "halo" means a group or compound including one more halogen (F, Cl, Br, or I) substituents, which can be the same or different. The prefix "hetero" means a group or compound that includes at least one ring member that is a heteroatom (e.g., 1, 2, or 3 heteroatoms, wherein each heteroatom is independently N, O, S, or P.

"Substituted" means that the compound or group is substituted with at least one (e.g., 1, 2, 3, or 4) substituents instead of hydrogen, where each substituent is independently nitro (—$NO_2$), cyano (—CN), hydroxy (—OH), halogen, thiol (—SH), thiocyano (—SCN), $C_{1-6}$ alkyl, $C_{2-6}$ alkenyl, $C_{2-6}$ alkynyl, $C_{1-6}$ haloalkyl, $C_{1-9}$ alkoxy, $C_{1-6}$ haloalkoxy, $C_{3-12}$ cycloalkyl, $C_{5-18}$ cycloalkenyl, $C_{6-12}$ aryl, $C_{7-13}$ arylalkylene (e.g, benzyl), $C_{7-12}$ alkylarylene (e.g, toluyl), $C_{4-12}$ heterocycloalkyl, $C_{3-12}$ heteroaryl, $C_{1-6}$ alkyl sulfonyl (—S(=O)$_2$-alkyl), $C_{6-12}$ arylsulfonyl (—S(=O)$_2$-aryl), or tosyl ($CH_3C_6H_4SO_2$—), provided that the substituted atom's normal valence is not exceeded, and that the substitution does not significantly adversely affect the manufacture, stability, or desired property of the compound. When a compound is substituted, the indicated number of carbon atoms is the total number of carbon atoms in the group, including those of the substituent(s).

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A process for the manufacture of thermoplastic polymer particles, the process comprising
    combining a first solution comprising a thermoplastic polymer and an organic solvent with a second solution comprising an aqueous solvent and a surfactant comprising gelatin to provide an emulsion;
    transferring the emulsion into a receiving water at a temperature of greater than or equal to 50° C. to remove the organic solvent and form an aqueous dispersion comprising a plurality of thermoplastic polymer particles dispersed in the aqueous solvent; and
    recovering thermoplastic polymer particles having a D50 of 20 to 100 μm;
    wherein the particles having a diameter less than 150 micrometers are recovered in a yield greater than 85%.

2. The process of claim 1, wherein the combining comprises agitating the first and second solutions at a speed of greater than 3,000 rotations per minute.

3. The process of claim 1, wherein
    the emulsion comprises the thermoplastic polymer in an amount of 10 to 30 weight percent, based on the total weight of thermoplastic polymer and organic solvent;
    the emulsion comprises water in a water-to-organic solvent weight ratio of greater than or equal to 0.4;
    the emulsion comprises the surfactant in a surfactant-to-thermoplastic polymer weight ratio of greater than or equal to 0.005.

4. The process of claim 1, wherein the transferring comprises adding the emulsion dropwise to the receiving water or spraying the emulsion into the receiving water.

5. The process of claim 1, wherein the recovering comprises filtering the aqueous dispersion to form a wet cake.

6. The process of claim 5, further comprising washing the wet cake with water.

7. The process of claim 5, further comprising drying the wet cake.

8. The process of claim 1, further comprising mixing the thermoplastic polymer particles with a flow promoter in an amount of 0.001 to 1 weight percent, based on the weight of the thermoplastic polymer particles, to provide particles having a flowability of greater than or equal to 4.

9. The process of claim 8, wherein the flow promoter comprises an unmodified fumed metal oxide, a hydrophobic fumed metal oxide, a hydrophilic fumed metal oxide, hydrated silica, amorphous alumina, glassy silica, glassy phosphate, glassy borate, glassy oxide, titania, talc, mica, kaolin, attapulgite, calcium silicate, magnesium silicate, or a combination comprising at least one of the foregoing.

10. The process of claim 1, wherein the particles have one or both of the following properties:
    a particle size distribution span of less than 2; and
    a bulk density of greater than 0.5 grams per cubic centimeter.

11. The process of claim 1, wherein the thermoplastic polymer is a polyarylate, a polycarbonate, a polyetherimide, a polyimide, a polysulfone, a polyethersulfone, a polyphenylene sulfone, a polyarylene ether, a polyestercarbonate, or a combination comprising at least one of the foregoing.

12. The process of claim 1, wherein the organic solvent has a boiling point that is less than 100° C., and is immiscible with water.

13. The process of claim 1, wherein
    the first solution further comprises an additive comprising a particulate filler, antioxidant, heat stabilizer, light stabilizer, ultraviolet light stabilizer, UV absorbing additive, NIR absorbing additive, IR absorbing additive, plasticizer, lubricant, release agent, antistatic agent, anti-fog agent, antimicrobial agent, colorant, laser marking additive, surface effect additive, radiation stabilizer, flame retardant, anti-drip agent, a fragrance, a fiber, or a combination comprising at least one of the foregoing; and
    the recovered particles comprise the additive.

14. The process of claim 1 comprising
    combining a first solution comprising a polycarbonate and an organic solvent with a second solution comprising an aqueous solvent and a surfactant comprising gelatin to provide an emulsion, wherein the emulsion comprises
water in a water-to-organic solvent weight ratio of 0.5 to 1,
the thermoplastic polymer in an amount of 15 to 25 weight percent, based on the total weight of polycarbonate and organic solvent, and
the surfactant in a surfactant-to-polycarbonate weight ratio of 0.01 to 0.04;
transferring the emulsion into a receiving water at a temperature of 50 to 100° C. to remove the organic solvent and form an aqueous dispersion comprising a plurality of polycarbonate particles dispersed in water; and
recovering polycarbonate particles having a diameter less than 150 micrometers and having a D50 of 20 to 80 μm, in a yield greater than or equal to 90%.

15. The process of claim 1 comprising
combining a first solution comprising a polyetherimide and an organic solvent with a second solution comprising an aqueous solvent and a surfactant comprising gelatin to provide an emulsion, wherein the emulsion comprises
water in a water-to-organic solvent weight ratio of 0.5 to 1,
the thermoplastic polymer in an amount of 15 to 25 weight percent, based on the total weight of polyetherimide and organic solvent, and
the surfactant in a surfactant-to-polyetherimide weight ratio of 0.01 to 0.04; and
transferring the emulsion into a receiving water at a temperature of 50 to 100° C. to remove the organic solvent and form an aqueous dispersion comprising a plurality of polyetherimide particles dispersed in water; and
recovering polyetherimide particles having a diameter less than 150 micrometers and having a D50 of 20 to 80 μm, in a yield greater than or equal to 90%.

* * * * *